US011361392B2

(12) United States Patent
Bhattarai et al.

(10) Patent No.: US 11,361,392 B2
(45) Date of Patent: Jun. 14, 2022

(54) FLEXIBLE ALLOCATION OF ENERGY STORAGE IN POWER GRIDS

(71) Applicant: BATTELLE MEMORIAL INSTITUTE, Richland, WA (US)

(72) Inventors: Bishnu P. Bhattarai, Kennewick, WA (US); Bilal Ahmad Bhatti, Blacksburg, VA (US); Robert G. Pratt, Kennewick, WA (US); Donald J. Hammerstrom, West Richland, WA (US); Steven E. Widergren, Kennewick, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 460 days.

(21) Appl. No.: 16/671,506

(22) Filed: Nov. 1, 2019

(65) Prior Publication Data

US 2020/0143489 A1     May 7, 2020

Related U.S. Application Data

(60) Provisional application No. 62/754,409, filed on Nov. 1, 2018.

(51) Int. Cl.
*G06Q 50/06*     (2012.01)
*G05B 19/042*     (2006.01)
(Continued)

(52) U.S. Cl.
CPC ........... *G06Q 50/06* (2013.01); *G05B 19/042* (2013.01); *H02J 3/32* (2013.01); *H02J 7/0068* (2013.01); *G05B 2219/2639* (2013.01)

(58) Field of Classification Search
CPC .................. G06Q 50/06; G05B 19/042; G05B 2219/2639; H02J 3/32; H02J 7/0068;
(Continued)

(56) References Cited

U.S. PATENT DOCUMENTS

| 4,010,614 A | 3/1977 | Arthur |
| 5,572,438 A | 11/1996 | Ehlers et al. |

(Continued)

FOREIGN PATENT DOCUMENTS

| CN | 107623386 A | 1/2018 |
| JP | 2008-204073 | 9/2008 |

(Continued)

OTHER PUBLICATIONS

AEP gridSmart demonstration project, Available: http://www.gridsmartohio.com/, Aug. 2013, 1 page.

(Continued)

*Primary Examiner* — Ziaul Karim
(74) *Attorney, Agent, or Firm* — Klarquist Sparkman, LLP

(57) ABSTRACT

Methods and apparatus provide flexible allocation and regulation of scheduled energy transfers between energy storage devices ("batteries") and a power grid. Piecewise mappings having at least one sloping segment enable gradual variations in scheduled energy transfers as cleared values of a medium of energy exchange deviate from predicted values of the medium of energy exchange. Thereby deviations from a battery's predicted energy transfer schedule can be reduced, and overall smoother operation of a power grid can be achieved. Two sloping linear segments can be separated by a dead band, a portion of the mapping in which the scheduled energy transfer amount is invariant. A dead zone can increase the likelihood of a battery meeting its predicted schedule.

21 Claims, 10 Drawing Sheets

(51) Int. Cl.
*H02J 7/00* (2006.01)
*H02J 3/32* (2006.01)

(58) Field of Classification Search
CPC . H02J 3/004; H02J 3/008; Y04S 10/50; Y04S 50/10
See application file for complete search history.

(56) References Cited

U.S. PATENT DOCUMENTS

| | | |
|---|---|---|
| 5,684,710 A | 11/1997 | Ehlers et al. |
| 5,696,695 A | 12/1997 | Ehlers et al. |
| 5,924,486 A | 7/1999 | Ehlers et al. |
| 6,216,956 B1 | 4/2001 | Ehlers et al. |
| 6,343,277 B1 | 1/2002 | Gaus et al. |
| 6,633,823 B2 | 10/2003 | Bartone et al. |
| 6,681,156 B1 | 1/2004 | Weiss |
| 6,895,325 B1 | 5/2005 | Munson, Jr. |
| 6,963,854 B1 | 11/2005 | Boyd et al. |
| 7,043,380 B2 | 5/2006 | Rodenberg et al. |
| 7,085,739 B1 | 8/2006 | Winter et al. |
| 7,130,719 B2 | 10/2006 | Ehlers et al. |
| 7,135,956 B2 | 11/2006 | Bartone et al. |
| 7,141,321 B2 | 11/2006 | McArthur et al. |
| 7,243,044 B2 | 7/2007 | McCalla |
| 7,249,169 B2 | 7/2007 | Blouin et al. |
| 7,343,226 B2 | 3/2008 | Ehlers et al. |
| 7,343,360 B1 | 3/2008 | Ristanovic et al. |
| 7,379,997 B2 | 5/2008 | Ehlers et al. |
| 7,418,428 B2 | 8/2008 | Ehlers et al. |
| 7,516,106 B2 | 4/2009 | Ehlers et al. |
| 7,599,866 B2 | 10/2009 | Yan et al. |
| 7,716,101 B2 | 5/2010 | Sandholm et al. |
| 7,953,519 B2 | 5/2011 | Hamilton, II et al. |
| 7,996,296 B2 | 8/2011 | Lange |
| 8,126,794 B2 | 2/2012 | Lange et al. |
| 8,271,345 B1 | 9/2012 | Milgrom et al. |
| 8,355,827 B2 | 1/2013 | Egnor et al. |
| 8,478,452 B2 | 7/2013 | Pratt et al. |
| 8,504,463 B2 | 8/2013 | Johnson et al. |
| 8,527,389 B2 | 9/2013 | Johnson et al. |
| 8,577,778 B2 | 11/2013 | Lange et al. |
| 8,639,392 B2 | 1/2014 | Chassin |
| 8,694,409 B2 | 4/2014 | Chassin et al. |
| 8,700,225 B2 | 4/2014 | Pratt et al. |
| 8,706,650 B2 | 4/2014 | Qzog |
| 8,788,415 B2 | 7/2014 | Chassin et al. |
| 8,892,264 B2 | 11/2014 | Steve et al. |
| 9,026,473 B2 | 5/2015 | Chassin et al. |
| 9,087,359 B2 | 7/2015 | Chassin |
| 9,094,385 B2 | 7/2015 | Akyol et al. |
| 9,129,337 B2 | 9/2015 | Chassin et al. |
| 9,240,026 B2 | 1/2016 | Chassin et al. |
| 9,245,297 B2 | 1/2016 | Chassin et al. |
| 9,269,108 B2 | 2/2016 | Chassin et al. |
| 9,310,792 B2 | 4/2016 | Lu et al. |
| 9,342,850 B2 | 5/2016 | Chassin et al. |
| 9,425,620 B2 | 8/2016 | Chassin et al. |
| 9,589,297 B2 | 3/2017 | Fuller et al. |
| 9,762,060 B2 | 9/2017 | Kalsi et al. |
| 9,817,375 B2 | 11/2017 | Li et al. |
| 9,965,802 B2 | 5/2018 | Powell et al. |
| 10,210,568 B2 | 2/2019 | Lian et al. |
| 2001/0032029 A1 | 10/2001 | Kauffman |
| 2002/0038279 A1 | 3/2002 | Samuelson et al. |
| 2002/0091626 A1 | 7/2002 | Johnson et al. |
| 2002/0128747 A1 | 9/2002 | Mima |
| 2002/0132144 A1 | 9/2002 | McArthur et al. |
| 2002/0178047 A1 | 11/2002 | Or et al. |
| 2003/0014379 A1 | 1/2003 | Saias et al. |
| 2003/0023540 A2 | 1/2003 | Johnson et al. |
| 2003/0036820 A1 | 2/2003 | Yellepeddy et al. |
| 2003/0040844 A1 | 2/2003 | Spool et al. |
| 2003/0040845 A1 | 2/2003 | Spool et al. |
| 2003/0041002 A1 | 2/2003 | Hao et al. |
| 2003/0041016 A1 | 2/2003 | Spool et al. |
| 2003/0041017 A1 | 2/2003 | Spool et al. |
| 2003/0055774 A1 | 3/2003 | Ginsberg |
| 2003/0078797 A1 | 4/2003 | Kanbara et al. |
| 2003/0093332 A1 | 5/2003 | Spool et al. |
| 2003/0093357 A1 | 5/2003 | Guler et al. |
| 2003/0139939 A1 | 7/2003 | Spool et al. |
| 2003/0144864 A1 | 7/2003 | Mazzarella |
| 2003/0149672 A1 | 8/2003 | Laskoski |
| 2003/0216971 A1 | 11/2003 | Sick et al. |
| 2004/0010478 A1 | 1/2004 | Peljto et al. |
| 2004/0015428 A2 | 1/2004 | Johnson et al. |
| 2004/0024483 A1 | 2/2004 | Holcombe |
| 2004/0128266 A1 | 7/2004 | Yellepeddy et al. |
| 2004/0133529 A1 | 7/2004 | Munster |
| 2004/0140908 A1 | 7/2004 | Gladwin et al. |
| 2004/0153330 A1 | 8/2004 | Miller et al. |
| 2004/0254688 A1 | 12/2004 | Chassin et al. |
| 2005/0015283 A1 | 1/2005 | Iino et al. |
| 2005/0027636 A1 | 2/2005 | Gilbert et al. |
| 2005/0065867 A1 | 3/2005 | Aisu et al. |
| 2005/0114255 A1 | 5/2005 | Shields et al. |
| 2005/0125243 A1 | 6/2005 | Villalobos |
| 2005/0137959 A1 | 6/2005 | Yan et al. |
| 2005/0197875 A1 | 9/2005 | Kauffman |
| 2005/0228553 A1 | 10/2005 | Tryon |
| 2006/0036357 A1 | 2/2006 | Isono et al. |
| 2006/0241951 A1 | 10/2006 | Cynamom et al. |
| 2006/0259199 A1 | 11/2006 | Gjerde et al. |
| 2006/0293980 A1 | 12/2006 | Corby et al. |
| 2007/0011080 A1 | 1/2007 | Jain et al. |
| 2007/0061248 A1 | 3/2007 | Shavit et al. |
| 2007/0087756 A1 | 4/2007 | Hoffberg |
| 2007/0124026 A1 | 5/2007 | Troxell et al. |
| 2008/0021628 A1 | 1/2008 | Tryon |
| 2008/0027639 A1 | 1/2008 | Tryon |
| 2008/0039980 A1 | 2/2008 | Pollack et al. |
| 2008/0046387 A1 | 2/2008 | Gopal et al. |
| 2008/0051977 A1 | 2/2008 | Tryon |
| 2008/0243664 A1 | 10/2008 | Shavit et al. |
| 2008/0243682 A1 | 10/2008 | Shavit et al. |
| 2008/0243719 A1 | 10/2008 | Shavit et al. |
| 2008/0281663 A1 | 11/2008 | Hakim |
| 2008/0297113 A1 | 12/2008 | Saeki et al. |
| 2008/0300907 A1 | 12/2008 | Musier et al. |
| 2008/0300935 A1 | 12/2008 | Musier et al. |
| 2008/0306801 A1 | 12/2008 | Musier et al. |
| 2008/0319893 A1 | 12/2008 | Mashinsky et al. |
| 2009/0063228 A1 | 3/2009 | Forbes |
| 2009/0132360 A1 | 5/2009 | Arfin et al. |
| 2009/0177591 A1 | 7/2009 | Thorpe et al. |
| 2009/0195349 A1 | 8/2009 | Frader-Thompson et al. |
| 2009/0228151 A1 | 9/2009 | Wang et al. |
| 2009/0307059 A1 | 12/2009 | Young et al. |
| 2009/0313174 A1 | 12/2009 | Hafner et al. |
| 2010/0010939 A1 | 1/2010 | Arfin et al. |
| 2010/0049371 A1 | 2/2010 | Martin |
| 2010/0057625 A1 | 3/2010 | Boss et al. |
| 2010/0076835 A1 | 3/2010 | Silverman |
| 2010/0106332 A1 | 4/2010 | Chassin et al. |
| 2010/0106641 A1 | 4/2010 | Chassin et al. |
| 2010/0107173 A1 | 4/2010 | Chassin |
| 2010/0114387 A1 | 5/2010 | Chassin |
| 2010/0121700 A1 | 5/2010 | Wigder et al. |
| 2010/0179862 A1 | 7/2010 | Pratt et al. |
| 2010/0216545 A1 | 8/2010 | Lange et al. |
| 2010/0217550 A1 | 8/2010 | Crabtree et al. |
| 2010/0218218 A1 | 8/2010 | Crabtree et al. |
| 2010/0256999 A1 | 10/2010 | Ghani et al. |
| 2010/0332373 A1 | 12/2010 | Crabtree et al. |
| 2011/0015801 A1 | 1/2011 | Mazzarella |
| 2011/0016055 A1 | 1/2011 | Mazzarella |
| 2011/0081955 A1 | 4/2011 | Lange et al. |
| 2011/0301964 A1 | 12/2011 | Conwell |
| 2012/0022995 A1 | 1/2012 | Lange |
| 2012/0083930 A1 | 4/2012 | Ilic et al. |
| 2012/0278220 A1 | 11/2012 | Chassin et al. |
| 2012/0278221 A1 | 11/2012 | Fuller et al. |
| 2013/0218743 A1 | 8/2013 | Chassin et al. |
| 2013/0218744 A1 | 8/2013 | Chassin et al. |

(56) References Cited

U.S. PATENT DOCUMENTS

| | | |
|---|---|---|
| 2013/0254090 A1 | 9/2013 | Chassin et al. |
| 2013/0268132 A1 | 10/2013 | Pratt et al. |
| 2013/0325691 A1 | 12/2013 | Chassin et al. |
| 2013/0325692 A1 | 12/2013 | Chassin et al. |
| 2014/0172503 A1 | 6/2014 | Hammerstrom et al. |
| 2014/0188689 A1 | 7/2014 | Kalsi et al. |
| 2014/0201018 A1 | 7/2014 | Chassin |
| 2016/0092978 A1 | 3/2016 | Lian et al. |
| 2016/0092986 A1 | 3/2016 | Lian et al. |
| 2017/0136889 A1* | 5/2017 | Ricci ............... B60L 53/65 |
| 2017/0136911 A1* | 5/2017 | Ricci ............... B60L 55/00 |
| 2017/0358041 A1* | 12/2017 | Forbes, Jr. .......... H02J 3/008 |
| 2019/0020220 A1 | 1/2019 | Lian et al. |
| 2019/0296577 A1 | 9/2019 | Lian et al. |

FOREIGN PATENT DOCUMENTS

| | | |
|---|---|---|
| WO | WO 1999/001822 | 1/1999 |
| WO | WO 2002/023693 | 3/2002 |
| WO | WO 2007/065135 | 6/2007 |

OTHER PUBLICATIONS

AEP Ohio power company standard tariff, Available: https://www.aepohio.com/account/bills/rates/AEPOhioRatesTariffsOH.aspx, Issued: Aug. 28, 2015, 187 pages.

Allcott, "Real Time Pricing and Electricity Markets," *Harvard University*, Feb. 5, 2009, 77 pages.

Basar, Lecture Notes on Noncooperative Game Theory, Jul. 26, 2010, 142 pages.

Bilgin et al., "Smart building real time pricing for offering load-side regulation service reserves," *In 52nd IEEE Conference on Decision and Control*, pp. 4341-4348, 2013.

Bishop et al., "Pattern recognition and machine learning," vol. 1, *Springer*, New York, 2006, 703 pages.

Borenstein et al., "Diagnosing Market Power in California's Deregulated Wholesale Electricity Market," University of California Energy Institute, Power, PWP-064, 54 pp. (Aug. 2000).

Borenstein et al., "Diagnosing Market Power in California's Deregulated Wholesale Electricity Market," University of California Energy Institute, Power, PWP-064, 52 pp. (Mar. 2000).

Borenstein et al., "Dynamic Pricing, Advanced Metering, and Demand Response in Electricity Markets," *Center for the Study of Energy Markets*, 2002, 103 pages.

Boyd et al., "Load Reduction, Demand Response, and Energy Efficient Technologies and Strategies," Pacific Northwest National Laboratory PNNL-18111, 44 pp. (Nov. 2008).

Brambley, "Thinking Ahead: Autonomic Buildings," ACEEE Summer Study on the Energy Efficiency in Buildings, vol. 7, pp. 73-86 (2002).

Burke et al., "Robust Control of Residential Demand Response Network with Low Bandwidth Input," *In Proceedings of Dynamic Systems and Control Conference, American Society of Mechanical Engineers*, pp. 413-415, Oct. 20-22, 2008.

Cai et al., "Economic Dispatch in Microgrids Using Multi-Agent System," *In North American Power Grid Symposium (NAPS)*, Sep. 2012, 5 pages.

Chandley, "How RTOs Set Spot Market Prices (And How It Helps Keep the Lights On)," PJM Interconnection, 23 pp. (Sep. 2007).

Chang et al., "Modeling and Control of Aggregated Air Conditioning Loads Under Realistic Conditions," *2013 IEEE PES Innovative Smart Grid Technologies (ISGT)*, Feb. 2013, 6 pages.

Chao, "Price-Responsive Demand Management for a Smart Grid World," *The Electricity Journal*, vol. 23, No. 1, Jan. 2010, pp. 7-20.

Chassin, "The Abstract Machine Model for Transaction-based System Control," Pacific Northwest National Laboratory PNNL-14082, 28 pp. (Nov. 2002).

Chassin et al., "Decentralized Coordination through Digital Technology, Dynamic Pricing, and Customer-Driven Control: The GridWise Testbed Demonstration Project," The Electricity Journal, vol. 21, pp. 51-59 (Oct. 2008).

Chassin et al., "Gauss-Seidel Accelerated: Implementing Flow Solvers on Field Programmable Gate Arrays," IEEE Power Engineering Society General Meeting, 5 pp. (Jun. 2006).

Chassin et al., "GridLAB-D: An Open-source Power Systems Modeling and Simulation Environment," *In IEEE Transmission and Distribution Conference and Exposition*, Aug. 2008, 5 pages.

Chassin, "GridLAB-D Technical Support Document: Tape Modules Version 1.0," Pacific Northwest National Laboratory PNNL-17614, 8 pp. (May 2008).

Chassin, "GridLAB-D Technical Support Document: Commercial Modules Version 1.0," Pacific Northwest National Laboratory PNNL-17615, 8 pp. (May 2008).

Chassin, "GridLAB-D Technical Support Document: Network Module Version 1.0," Pacific Northwest National Laboratory PNNL-17616, 10 pp. (May 2008).

Chassin et al., "Modeling Power Systems as Complex Adaptive Systems," Pacific Northwest National Laboratory PNNL-14987, 151 pp. (Dec. 2004).

Chassin et al., "The pacific northwest demand response market demonstration," IEEE, 6 pp. (Jul. 2008).

Chassin et al., "Project 2.6—Enhancement of the Whole-Building Diagnostician," Pacific Northwest National Laboratory PNNL-14383, 17 pp. (Aug. 2003).

Chassin, "Statistical Mechanics: A Possible Model for Market-based Electric Power Control", Proc. of the 37th Hawaii Int'l Conf. on System Sciences, 10 pp. (Jan. 2004).

Chen et al., "The Influence of Topology Changes on Inter-area Oscillation Modes and Mode Shapes," IEEE Power and Energy Society General Meeting, 7 pp. (Jul. 2011).

Chen et al., "Real-time power control of data centers for providing regulation service," *In 52nd IEEE Conference on Decision and Control*, Dec. 10-13, 2013, pp. 4314-4321.

Chen et al., "Two Market Models for Demand Response in Power Networks," *In Proceedings of 2010 First IEEE International Conference on Smart Grid Communications (SmartGridComm)*, Oct. 4-6, 2010, pp. 397-402.

Clearwater et al., "Thermal Markets for Controlling Building Environments," Energy Engineering, vol. 91, No. 3, pp. 26-56 (1994).

Collins, "Error Analysis in Scanned Holography," *Oregon State University*, Ph.D. thesis, Jun. 1970, 110 pages.

Conejo et al., "Price-Taker Bidding Strategy Under Price Uncertainty," *IEEE Transactions on Power Systems*, vol. 17, No. 4, Nov. 2002, pp. 1081-1088.

Cong et al., "FlowMap: An Optimal Technology Mapping Algorithm for Delay Optimization in Lookup-Table Based FPGA Designs," *IEEE Transactions on Computer-Aided Design of Integrated Circuits and Systems*, vol. 13, No. 1, Jan. 1994, 12 pages.

De Ladurantaye et al., "Strategic Bidding for Price-Taker Hydroelectricity Producers," *IEEE Transactions on Power Systems*, vol. 22, No. 4, Nov. 2007.

Denholm et al., "An Evaluation of Utility System Impacts and Benefits of Optimally Dispatched Plug-In Hybrid Electric Vehicles," NREL Technical Report NREL/TP-620-40293, 30 pp. (Oct. 2006).

Denton et al., "Spot Market Mechanism Design and Competitivity Issues in Electric Power," Proc. of the 31st Hawaii International Conference on System Sciences, vol. 3, pp. 48-56 (Jan. 1998).

Diao et al., "Deriving Optimal Operational Rules for Mitigating Inter-area Oscillations," IEEE/PES Power Systems Conference & Exposition, 8 pp. (Mar. 2011).

Dominguez-Garcia et al., "Resilient Networked Control of Distributed Energy Resources," *IEEE Journal on Selected Areas in Communications*, vol. 30, No. 6, Jul. 2012, pp. 1137-1148.

Driesen et al., "Design for Distributed Energy Resources," *IEEE Power & Energy Magazine*, vol. 6, No. 3, pp. 30-40, May/Jun. 2008.

Examiner's Report from the Canadian Intellectual Property Office for Canadian Application No. 2,749,373, dated Jan. 6, 2016, 5 pages.

Fahrioglu et al., "Designing Incentive Compatible Contracts for Effective Demand Management," *IEEE Transactions on Power Systems*, vol. 15, No. 4, Nov. 2000, pp. 1255-1260.

Farhangi, "The Path of the Smart Grid," *IEEE Power & Energy Magazine*, vol. 8, No. 1, pp. 18-28, Jan./Feb. 2010.

(56) References Cited

OTHER PUBLICATIONS

Faruqui et al., "The impact of informational feedback on energy consumption—A survey of the experimental evidence," *Energy*, vol. 35, No. 4, 2010, pp. 1598-1608.
Feigenbaum et al., "Distributed Algorithmic Mechanism Design: Recent Results and Future Directions," *In Proceedings of the 6th International Workshop on Discrete Algorithms and Methods for Mobile Computing and Communications*, Sep. 2002, 13 pages.
Fernandez et al., "Self Correcting HVAC Controls: Algorithms for Sensors and Dampers in Air-Handling Units," Pacific Northwest Laboratory PNNL-19104, 49 pp. (Dec. 2009).
Francis et al., "Chortle-crf: Fast Technology Mapping for Lookup Table-Based FPGAs," *28th ACM/IEEE Design Automation Conference*, Jun. 21, 1991, pp. 227-233.
Fuller et al., "Analysis of Residential Demand Response and Double-Auction Markets," *In Power and Energy Society General Meeting, IEEE*, Jul. 24-29, 2011, 7 pages.
Fuller et al., "Evaluation of Representative Smart Grid Investment Grant Project Technologies: Demand Response," Pacific Northwest National Laboratory PNNL-20772, 349 pp. (Feb. 2012).
Fuller et al., "Modeling of GE Appliances in GridLAB-D: Peak Demand Reduction," Pacific Northwest National Laboratory PNNL-21358, 157 pp. (Apr. 2012).
Gatterbauer, "Interdependencies of Electricity Market Characteristics and Bidding Strategies of Power Producers," Master's Thesis, Massachusetts Institute of Technology, 33 pp. (May 2002).
Georgilakis, "Market Clearing Price Forecasting in Deregulated Electricity Markets Using Adaptively Trained Neural Networks," Hellenic Conference on Artificial Intelligence, vol. 3955, pp. 56-66 (2006).
Gjerstad et al., "Price Formation in Double Auctions," *Games and Economic Behavior*, vol. 22, article No. GA970576, pp. 1-29 (1998). (Document marked as Received Nov. 30, 1995).
Green Car Congress, "PG&E and Tesla to Research Smart Recharging Vehicle-to-Grid Technology," downloaded from http://www.greencarcongress.com/2007/09/pge-and-tesla-t.html, 3 pp. (Sep. 12, 2007).
GridLAB-D residential module user's guide, Available: http://sourceforeg.net/apps/mediawiki/gridlab-d, last modified on Oct. 22, 2013, 24 pages.
Guttromson et al., "Residential energy resource models for distribution feeder simulation," IEEE, vol. 1, pp. 108-113 (Jul. 2003).
Hammerstrom et al., "Pacific Northwest GridWise™ Testbed Demonstration Projects," *Part I, Olympic Peninsula Project, Pacific Northwest National Laboratory*, Oct. 2007, 157 pages.
Hammerstrom et al., "Pacific Northwest GridWise Testbed demonstration Projects: Part II. Grid Friendly Appliance Project," Pacific Northwest National Laboratory PNNL-17079, 123 pp. (Oct. 2007).
Hammerstrom et al., "Standardization of a Hierarchical Transactive Control System," Grid Interop Conf., 7 pp. (Nov. 2009).
Han et al., "Development of an Optimal Vehicle-to-Grid Aggregator for Frequency Regulation," *IEEE Transactions on Smart Grid*, vol. 1, No. 1, Jun. 2010, pp. 65-72.
Hao et al., "Aggregate Flexibility of Thermostatically Controlled Loads," *IEEE Transactions on Power Systems*, vol. 30, No. 1, Jan. 2015, pp. 189-198.
Hao et al., "Ancillary Service for the Grid via Control of Commercial Building HVAC Systems," *In 2013 American Control Conference, IEEE*, Jun. 17-19, 2013, pp. 467-472.
Hatley et al., "Energy Management and Control System: Desired Capabilities and Functionality," Pacific Northwest National Laboratory PNNL-15074, 46 pp. (Apr. 2005).
Hô et al., "Econophysical Dynamics of Market-Based Electric Power Distribution Systems," IEEE, pp. 1-6 (Jan. 2006).
Hsu et al., "Dispatch of Direct Load Control Using Dynamic Programming," *IEEE Transactions on Power Systems*, vol. 6, No. 3, Aug. 1991, pp. 1056-1061.
Huang et al., "Analytics and Transactive Control Design for the Pacific Northwest Smart Grid Demonstration Project," *In 2010 First IEEE International Conference on Smart Grid Communications (SmartGridCom), IEEE*, Oct. 4-6, 2010, pp. 449-454.
Huang et al., "MANGO—Modal Analysis for Grid Operation: A Method for Damping Improvement through Operating Point Adjustment," Pacific Northwest National Laboratory PNNL-19890, 92 pp. (Oct. 2010).
Huang et al., "Transforming Power Grid Operations," Scientific Computing, vol. 45, No. 5, pp. 22-27 (Apr. 2007).
Huberman et al., "A Multi-Agent System for Controlling Building Environments," *In Proceedings of the First International Conference on Multiagent Systems*, Jun. 12-14, 1995, pp. 171-176.
Hurwicz, "The Design of Mechanisms for Resource Allocation," In *The American Economic Review*, Papers and Proceedings of the Eighty-fifth Annual Meeting of the American Economic Association, vol. 63, No. 2, May 1973, 31 pages.
Kakhbod et al., "Power Allocation and Spectrum Sharing in Wireless Networks: An Implementation Theory Approach," *Mechanisms and Games for Dynamic Spectrum Allocation (Chapter 5)*, Feb. 2014, 42 pages.
Kannberg et al., "GridWise: The Benefits of a Transformed Energy System," Pacific Northwest National Laboratory PNNL-14396, 48 pp. (Sep. 2003).
Kar et al., "Distributed Robust Economic Dispatch in Power Systems: A Concensus + Innovations Approach," *In Proc. IEEE Power and Energy Society General Meeting*, Jul. 2012, 8 pages.
Katipamula et al., "Evaluation of Residential HVAC Control Strategies for Demand Response Programs," ASHRAE Trans., Symp. on Demand Response Strategies for Building Systems, 12 pp (Jan. 2006).
Katipamula et al., "Transactive Controls: A Market-Based GridWise Controls for Building Systems," Pacific Northwest National Laboratory PNNL-15921, 14 pp. (Jul. 2006).
Kersting, "Radial Distribution Test Feeders," *IEEE Transactions on Power Systems*, vol. 6, No. 3, pp. 975-985, Aug. 1991.
Kiesling, "Retail Electricity Deregulation: Prospects and Challenges for Dynamic Pricing and Enabling Technologies," The Searle Center Annual Review of Regulation, 44 pp. (May 2007).
Kim et al., "Scheduling Power Consumption With Price Uncertainty," *IEEE Transactions on Smart Grid*, vol. 2, No. 3, Sep. 2011, pp. 519-527.
Kinter-Meyer et al., "Final Report for the Energy Efficient and Affordable Small Commercial and Residential Buildings Research Program—Project 3.3—Smart Load Control and Grid Friendly Appliances," Pacific Northwest National Laboratory PNNL-14342, 147 pp. (Jul. 2003).
Kok et al., "Agent-based Electricity Balancing with Distributed Energy Resources, A Multiperspective Case Study," Proc. Hawaii Int'l Conf. on System Sciences, 10 pp. (Jan. 2008).
Kok et al., "Dynamic Pricing by Scalable Energy Management Systems—Field Experiences and Simulation Results using Powermatcher," *In IEEE Power and Energy Society General Meeting*, Jul. 2012, 8 pages.
Kok et al., "Intelligence in Electricity Networks for Embedding Renewables and Distributed Generation," *In Intelligent infrastructures*, Springer, 2010, pp. 179-209.
Kok et al., "PowerMatcher: Multiagent Control in the Electricity Infrastructure," AAMAS, 8 pp. (Jul. 2005).
Lasseter et al., "Integration of Distributed Energy Resources. The CERTS MicroGrid Concept," *Lawrence Berkeley National Laboratory*, Oct. 2013, 32 pages.
Lemay et al., "An Integrated Architecture for Demand Response Communications and Control," Hawaii Int'l Conf. on System Sciences, 10 pp. (Jan. 2008).
Li et al., "Integrated Power Management of Data Centers and Electric Vehicles for Energy and Regulation Market Participation," *IEEE Transactions on Smart Grid*, vol. 5, No. 5, Sep. 2014, pp. 2283-2294.
Li et al., Market-Based Coordination of Thermostatically Controlled Loads—Part I: Mechanism Design Formulation, *IEEE Transactions on Power System*, Mar. 15, 2015, 11 pages.
Li et al., Market-Based Coordination of Thermostatically Controlled Loads—Part II: Unknown Parameters and Case Studies *IEEE Transactions on Power System*, Mar. 15, 2015, 9 pages.

(56) References Cited

OTHER PUBLICATIONS

Li et al., "A Market Mechanism Design Approach for Coordination of Thermostatically Controlled Loads With Unknown Parameters (Part I)," *IEEE Transactions on Power System*, 2014, 8 pages.

Li et al., "A Market Mechanism Design Approach for Coordination of Thermostatically Controlled Loads With Unknown Parameters (Part II)," *IEEE Transactions on Power System*, 2014, 8 pages.

Li et al., "A Mechanism Design Approach for Coordination of Thermostatically Controlled Loads," Available at http://arxiv.org/abs/1503.02705, last updated Jun. 15, 2015, 16 pages.

Li et al., "Optimal Demand Response Based on Utility Maximization in Power Networks," *In Power and Energy Society General Meeting*, IEEE, Jul. 24-29, 2011, 8 pages.

Liu et al., "Planning and Control of Electric Vehicles Using Dynamic Energy Capacity Models," *In 52nd Annual Conference on Decision and Control (CDC)*, IEEE, Dec. 10-13, 2013, pp. 379-384.

Ljung, *System Identification: Theory for the User*, 255 pages (Prentice Hall 1987).

Lu et al., "Control Strategies of Thermostatically Controlled Appliances in a Competitive Electricity Market," IEEE Proc. Power Engineering Society General Meeting, pp. 202-207 (Jun. 2005).

Lu et al., "Design Considerations for Frequency Responsive Grid Friendly Appliances," IEEE PES Trans. and Distribution Conference and Exhibition, 6 pp. (May 2006).

Lu et al., "An Evaluation of the HVAC Load Potential for Providing Load Balance Service," *IEEE Transactions on Smart Grid*, vol. 3, No. 3, Sep. 2012, pp. 263-1270.

Lu et al., "Grid Friendly Device Model Development and Simulation," Pacific Northwest National Laboratory PNNL-18998, 52 pp. (Nov. 2009).

Lu et al., "Modeling Uncertainties in Aggregated Thermostatically Controlled Loads Using a State Queueing Model," IEEE Trans. on Power Systems, vol. 20, No. 2, pp. 725-773 (May 2005).

Lu et al., "Reputation-Aware Transaction Mechanisms in Grid Resource Market," IEEE Sixth Int'l Conf. on Grid and Cooperative Computing, 6 pp. (Aug. 2007).

Lu et al., "Simulating Price Responsive Distributed Resources," IEEE, vol. 3, pp. 1538-1543 (Oct. 2004).

Lu et al., "A State-Queueing Model of Thermostatically Controlled Appliances," IEEE Trans. on Power Systems, vol. 19, No. 3, pp. 1666-1673 (Aug. 2004).

Marion et al., "User's Manual for TMY2s: Typical Meteorological Years: Derived from the 1961-1990 National Solar Radiation data Base," *National Renewable Energy Laboratory*, Jun. 1995, 55 pages.

Mas-Colell et al., "Microeconomic Theory," *Oxford University Press*, © 1995, 501 pages.

Maskin, "Mechanism Design: How to Implement Social Goals," In Les Prix Nobel 2007, pp. 296-307 (2008).

Mathieu et al., "State Estimation and Control of Electric Loads to Manage Real-Time Energy Imbalance," *IEEE Transactions on Power Systems*, vol. 28, No. 1, Feb. 2013, pp. 430-440.

Moeslund, et al., "A Survey of Computer Vision-Based Human Motion Capture," *Computer Vision and Image Understanding*, vol. 81, No. 3, Mar. 2001, pp. 231-268.

Mohsenian-Rad et al., "Optimal Residential Load Control With Price Prediction in Real-Time Electricity Pricing Environments," *IEEE Transactions on Smart Grid*, vol. 1, No. 2, Sep. 2010, pp. 120-133.

Nanduri et al., "A Methodology for Evaluating Auction Based Pricing Strategies in Deregulated Energy Markets," Working Paper, 12 pp. (2005).

Nanduri, et al., "A Reinforcement Learning Model to Assess Market Power Under Auction-Based Energy Pricing," IEEE Trans. on Power Systems, vol. 22, No. 1, pp. 85-95 (Feb. 2007).

Nguyen et al., "Optimal Bidding Strategy for Microgrids Considering Renewable Energy and Building Thermal Dynamics," *IEEE Transactions on Smart Grid*, vol. 5, No. 4, Jul. 2014, pp. 1608-1620.

Nicolaisen et al., "Market Power and Efficiency in a Computational Electricity Market With Discriminatory Double-Auction Pricing," ISU Economic Report No. 52, 26 pp. (Aug. 27, 2000; revised Aug. 24, 2001).

Non-Final Office Action issued in U.S. Appl. No. 14/866,457, dated Mar. 13, 2018, 18 pages.

Notice of Allowance for U.S. Appl. No. 14/866,457, dated Sep. 4, 2018, 9 pages.

Ntakou et al., "Price Discovery in Dynamic Power Markets with Low-Voltage Distribution-Network Participants," *In IEEE Transmission and Distribution Conference and Exposition*, Apr. 14-17, 2014, 5 pages.

O'Neill et al., "Model-Based Thermal Load Estimation in Buildings," *Fourth National Conference of IBPSA-USA*, Aug. 2010, 9 pages.

Palensky et al., "Demand Side Management: Demand Response, Intelligent Energy Systems, and Smart Loads," *IEEE Transactions on Industrial Informatics*, vol. 7, No. 3, Aug. 2011, pp. 381-388.

Pantoja et al., "Dispatch of Distributed Generators under Local-Information Constraints," *In 2014 American Control Conference (ACC)*, Jun. 4-6, 2014, pp. 2682-2687.

Papavastiou et al., "Large-Scale Integration of Deferrable Demand and Renwable Energy Sources", IEEE Transactions on Power Systems, vol. 29, No. 1, pp. 489-499, Jan. 1, 2014.

Parkes, "Iterative Combinatorial Auctions: Achieving Economic and Computational Efficiency," PhD thesis, University of Pennsylvania, 2000, 115 pages.

Paschatidis et al., "Demand-Side Management for Regulation Service Provisioning Through Internal Pricing," *IEEE Transactions on Power System*, vol. 27, No. 3, Aug. 2012, pp. 1531-1539.

Pedrasa et al., "Coordinated Scheduling of Residential Distributed Energy Resources to Optimize Smart Home Energy Services," *IEEE Transactions on Smart Grid*, vol. 1, No. 2, Sep. 2010, pp. 134-143.

Philpott et al., "Optimizing Demand-Side Bids in Day-Ahead Electricity Markets", *IEEE Transactions on Power Systems*, vol. 21, No. 2, pp. 488-498, (May 2006).

PJM wholesale market energy price, available at: http://www.pjm.com/markets-and-operations/energy.aspx, uploaded Sep. 16, 2015, 3 pages.

Plott et al., "Instability of Equilibria in Experimental Markets: Upward-sloping Demands, Externalities, and Fad-like Incentives," Southern Economic Journal, vol. 65 (3), 23 pp. (Jan. 1999).

Pourebrahimi et al., "Market-based Resource Allocation in Grids," IEEE Int'l Conf. on e-Science and Grid Computing, 8 pp. (2006).

Pratt et al., "Potential Impacts of High Penetration of Plug-in Hybrid Vehicles on the U.S. Power Grid," DOE/EERE PHEV Stakeholder Workshop, 14 pp. (Jun. 2007).

Rahimi et al., "Demand Response as a Market Resource Under the Smart Grid Paradigm," *IEEE Transactions on Smart Grid*, vol. 1, No. 1, Jun. 2010, pp. 82-88.

Rasouli et al., "Electricity Pooling Markets with Strategic Producers Possessing Asymmetric Information I: Elastic Demand," arXiv. 1401.4230, Jan. 17, 2014, 8 pages.

Reiter, "Information Incentive and Performance in the (new) Welfare Economics," reprinted from American Economic Review, vol. 67, No. 1, Feb. 1977, 27 pages.

Sage et al., *Estimation Theory with Applications to Communications and Control*, 540 pages (1971).

Satehfar et al., "A Production Costing Methodology for Evaluation of Direct Load Control," *IEEE Transactions on Power Systems*, vol. 6, No. 1, Feb. 1991, pp. 278-284.

Samadi et al., "Advanced Demand Side Management for the Future Smart Grid Using Mechanism Design," *IEEE Transactions on Smart Grid*, vol. 3, No. 3, Sep. 2012, pp. 1170-1180.

Satayapiwat et al., "A Utility-based Double Auction Mechanism for Efficient Grid Resource Allocation," Int'l Symp. on Parallel and Distributed Processing with Applications (ISPA '08), pp. 252-260 (Dec. 10-12, 2008).

Schneider et al., "Analysis of Distribution Level Residential Demand Response," IEEE/PES Power System Conference and Exposition, 6 pp. (Mar. 2011).

(56) References Cited

OTHER PUBLICATIONS

Schneider et al., "Detailed End Use Load Modeling for Distribution System Analysis," IEEE Power and Energy Society General Meeting, 7 pp. (Jul. 2010).

Schneider et al., "Distribution Power Flow for Smart Grid Technologies," IEEE/PES Power System Conference and Exhibition, 7 pp. (Mar. 2009).

Schneider et al., "Evaluation of Conservation Voltage Reduction (CVR) on a National Level," Pacific Northwest National Laboratory PNNL-19596, 114 pp. (Jul. 2010).

Schneider et al., "Modem Grid Strategy: Enhanced GridLAB-D Capabilities Final Report," Pacific Northwest National Laboratory PNNL-18864, 30 pp. (Sep. 2009).

Schneider et al., "Multi-State Load Models for Distribution System Analysis," IEEE Trans. on Power Systems, vol. 26, No. 4, pp. 2425-2433 (Nov. 2011).

Schneider et al., "A Taxonomy of North American Radial Distribution Feeders," IEEE Power & Energy Society General Meeting, 6 pp. (Jul. 2009).

Schneider et al., "Voltage Control Devices on the IEEE 8500 Node Test Feeder," IEEE Pes Transmission & Distribution Conference & Exposition, 6 pp. (Apr. 2010).

Sharma et al., "Local public good provisioning in networks: A Nash implementation mechanism," *IEEE Journal on Selected Areas in Communications*, vol. 30, No. 11, Dec. 2012, pp. 2105-2116.

Singh et al., "Effects of Distributed Energy Resources on Conservation Voltage Reduction (CVR)," IEEE Power and Energy Society General Meeting, 7 pp. (Jul. 2011).

Sonderegger, "Diagnostic Tests Determining the Thermal Response of a House," *Lawrence Berkeley Laboratory*, Nov. 1977, 18 pages.

Sonderegger, "Dynamic models of house heating based on equivalent thermal parameters," Ph.D. Thesis, Princeton University, Dec. 1978, 277 pages.

Steinway, Book Review of "Estimation Theory with Applications to Communication and Control," *IEEE Transactions on Systems, Man, and Cybernetics*, Oct. 1971, p. 405.

Taylor et al., "GridLAB-D Technical Support Document: Residential End-Use Module Version 1.0," Pacific Northwest National Laboratory PNNL-17694, 30 pp. (Jul. 2008).

Vandael et al., "A Scalable Three-Step Approach for Demand Side Management of Plug-in Hybrid Vehicles," *IEEE Transactions on Smart Grid*, vol. 4, No. 2, Jun. 2013, pp. 720-728.

Vrettos et al., "Demand Response with Moving Horizon Estimation of Individual Thermostatic Load States from Aggregate Power Measurements," *In 2014 American Control Conference (ACC)*, Jun. 4-6, 2014, pp. 4846-4853.

Weather History for KOSU, Aug. 2009, 5 pages.

Weather Underground: Weather History for Ohio State University, OH, downloaded from http://www.wunderground.com, 4 pages.

Wellman, "A Market-Oriented Programming Environment and its Application to Distributed Multicommodity Flow Problems," *Journal of Artificial Intelligence Research*, Aug. 1993, 23 pages.

Widergren et al., "Residential Real-time Price Response Simulation," IEEE Power and Energy Society General Meeting, pp. 3074-3078 (Jul. 2011).

Wilson et al., "Equivalent Thermal Parameters for an Occupied Gas-Heated House," *ASHRAE Trans.*; (United States), 91(CONF-850606-), 1985, pp. 1875-1885.

Wolak, "Residential Customer Response to Real-Time Pricing: The Anaheim Critical-Peak Pricing Experiment," document marked May 24, 2006, 49 pages (also published as Wolak, "Residential Customer Response to Real-Time Pricing: The Anaheim Critical-Peak Pricing Experiment," *Center for the Study of Energy Markets* (2007)).

Yang, "Adaptively Robust Kalman Filters with Applications in Navigation," Chapter 2 of *Sciences of Geodesy-1*, Jun. 2010, pp. 49-82.

Yang et al., "Consensus Based Approach for Economic Dispatch Problem in a Smart Grid," *IEEE Transactions on Power Systems*,vol. 28, No. 4, Nov. 2013, pp. 4416-4426.

Ygge et al., "Decentralized Markets versus Central Control: A Comparative Study," *Journal of Artificial Intelligence Research*, vol. 11, Oct. 1999, pp. 301-333.

Ygge et al., "Making a Case for Multi-Agent Systems," Research Report Apr. 1997, University of Karlskrona/Ronneby, Sweden 23 pages (also published as Ygge et al., "Making a Case for Multi-Agent Systems," In Multi-Agent Rationality, pp. 156-176, Springer Berlin Heidelberg (1997)).

Ygge, "Market-Oriented Programming and its Application to Power Load Management," *Lund University*, Ph.D. Thesis, 1998.

Ygge et al., "Power Load Management as a Computational Market," document not dated, 14 pages (*published as Ygge et al., "Power Load Management as a Computational Marked," Proceedings of the 2nd International Conference on Multi-Agent Systems (ICMAS '96)*, pp. 393-400, (1996).

Yin et al., "A Novel Double Auction Mechanism for Electronic Commerce: Theory and Implementation," IEEE Proc. of the Third Int'l Conf. on Machine Learning and Cybernetics, pp. 53-58 (Aug. 2004).

Zhang et al., "Aggregated Modeling and Control of Air Conditioning Loads for Demand Response," *IEEE Transactions on Power Systems*, vol. 28, No. 4, Nov. 2013, pp. 4655-4664.

Zhang et al., "Convergence Analysis of the Incremental Cost Consensus Algorithm Under Different Communication Network Topologies in a Smart Grid," *IEEE Transactions on Power System*, vol. 27, No. 4, Nov. 2012, pp. 1761-1768.

Zhang et al., "Decentralizing the Economic Dispatch Problem using a Two-Level Incremental Cost Consensus Algorithm in a Smart Grid Environment," *In 2011 North American Power Symposium (NAPS)*, IEEE, Aug. 4-6, 2011, 7 pages.

\* cited by examiner

FLEXIBLE ALLOCATION OF ENERGY STORAGE IN POWER GRIDS

CROSS-REFERENCE TO RELATED APPLICATIONS

This application claims the benefit of U.S. Provisional Patent Application No. 62/754,409, entitled "FLEXIBLE BIDDING FOR ELECTRIC ENERGY STORAGE TO PARTICIPATE IN DAY-AHEAD TRANSACTIVE MARKETS," filed Nov. 1, 2018, which application is incorporated herein by reference in entirety.

ACKNOWLEDGMENT OF GOVERNMENT SUPPORT

This invention was made with Government support under Contract DE-AC05-76RL01830 awarded by the U.S. Department of Energy. The Government has certain rights in the invention.

BACKGROUND

Smart energy grids continue to evolve as new types and increasing numbers of participants enter energy markets. Energy suppliers and consumers on today's grids can have a variety of operational characteristics. Evolving technologies allow large numbers of distributed small-scale or non-traditional participants to collectively have large impacts on such markets. Transactive energy markets have developed to coordinate energy flows in such diverse and heterogeneous environments. These and other technological developments offer new opportunities and also bring new challenges.

Batteries, in particular, offer opportunities to stabilize distributed and diverse grids. Batteries can operate in charging mode to take up excess supply, and can operate in discharging mode to satisfy peak demands. However, transactive markets pose unique problems for batteries. A rejected bid from a battery can leave some battery capacity unutilized, to the detriment of the battery's operator and the market overall. Moreover, a battery can be unable to fulfill a discharge commitment if it is in a depleted state, which can lead to penalties for the battery's operator and inefficiency for the market as a whole. Accordingly, there is ample opportunity for improved technology for managing battery operations.

SUMMARY

Methods and apparatus are disclosed for flexible allocation and regulation of energy transfer to and from energy storage in power grids. In some embodiments, piecewise mappings allow for energy transfer instructions to energy storage devices to adapt gradually as a cleared value of a medium of energy exchange deviates from a predicted value of the medium of energy exchange. The piecewise mappings can be piecewise linear functions, and can optionally include a dead band. The disclosed technologies can support efficient scheduled allocation of energy transfers for distributed heterogeneous energy storage devices in a power grid.

According to one aspect, the disclosed technologies can be implemented as a method of allocating energy transfer between a battery and a power grid. A target amount of energy transfer in a time period is determined, a parameter is determined, and a piecewise mapping for the time period is submitted. Determination of the target amount of energy transfer is based at least partly on a predicted value of a medium of energy exchange for the time period. The parameter indicates a change in an amount of the energy transfer per unit change in a cleared value of the medium of energy exchange. The piecewise mapping specifies one or more segments, at least one segment of which has the determined parameter, for example as slope of the segment. The piecewise mapping includes both charging and discharging amounts of the energy transfer, and evaluates to the determined target amount at the predicted value of the medium of energy exchange.

In some examples, the piecewise mapping can be a piecewise linear function. The piecewise linear function can be specified by two points. The piecewise mapping can be a bid function indicating a bid amount of energy transfer to be executed, as a function of the cleared value of the medium of energy exchange. The bid function can include a dead band at a first value of the bid amount. In varying examples, the first value of the bid amount (i.e. a location of the dead zone) can be equal to the target amount, or can equal zero. The bid function can include a second dead band at a second value of the bid amount that, the second value being distinct from the first value of the bid amount. The piecewise mapping can be limited by a predetermined charging or discharging amount of the energy transfer.

In additional examples, the time period can be one of multiple time periods, and the method can also include submitting additional piecewise mappings for additional respective time periods. The multiple time periods can cover a day ahead. The piecewise mapping and the additional piecewise mappings can be jointly determined. The multiple time periods can have respective predicted values of the medium of energy exchange. The determining of the parameter can be based, at least partly, on a spread of the respective predicted values. The determining of the parameter can also be based, at least partly, on predetermined charging and discharging attributes of the battery.

In further examples, the method can include selecting a supplier from among a plurality of suppliers providing forecasts, and receiving the predicted value of the medium of energy exchange from the selected supplier. The method can include receiving a grant of an energy transfer for the time period, and executing the granted energy transfer during the time period.

In a second aspect, the disclosed technologies can be implemented as a method. A piecewise linear bid on behalf of a battery is received, the bid being for a given time period in an energy market. The piecewise linear bid includes one or more linear segments and defines a bid quantity for energy transfer as a function of cleared energy price. At least one of the linear segments can have a non-zero slope. The bid quantity of the piecewise linear bid spans a range including both charging and discharging of the battery. The energy market is cleared to determine the cleared energy price, and the piecewise linear bid is evaluated at the cleared energy price to determine an energy transfer granted to the battery. The granted energy transfer is transmitted, for execution at the battery.

In some examples, the clearing can be partly based on the received piecewise linear bid. The piecewise linear bid can extend from a minimum value of the bid quantity to a maximum value of the bid quantity, and can include a dead band. The given time period can be one hour in a day ahead period. The clearing for the given time period can be performed concurrently with clearing at least one other hour of the day ahead period.

In further examples, the battery can be one of multiple batteries from which respective piecewise linear bids for the given time period are received. The clearing can be based partly on the piecewise linear bids of the multiple batteries, and can be based partly on inputs received from one or more of: an electric utility, a load operator, or an aggregator. The clearing can be performed at a market coordinator, and the receiving, evaluating, and transmitting can be performed at an aggregator. The method can also include the following operations performed at the aggregator. The received piecewise linear bid can be consolidated with other bids for other batteries into a consolidated bid. The consolidated bid can be forwarded to the market coordinator to be used in the clearing of the energy market. A consolidated grant can be received from the market coordinator, and can be disaggregated to determine the granted energy transfer.

In another aspect, the disclosed technologies can be implemented as computer-readable media containing instructions which, when executed by one or more hardware processors, cause the one or more hardware processors to perform any disclosed method.

In a further aspect, the disclosed technologies can be implemented as a system including a coordinator computer and multiple energy storage subsystems. The coordinator computer is configured to receive submissions and transmit responsive energy transfer awards to agents via a network. Each energy storage subsystem includes one or more energy storage devices, an agent, and a controller. The agent is configured to transmit a submission, on behalf of the energy storage device(s) to the coordinator computer via the network and to receive, responsive to the transmitted submission, an energy transfer award from the coordinator computer. The controller is configured to charge or discharge the battery, responsive to the energy transfer award being received at the energy storage subsystem. Each submission specifies an amount of energy transfer as a monotonic function of a clearing energy price. At least one of the submissions includes both charging and discharging amounts of energy transfer.

In some examples, one of the controllers can be shared by two or more of the energy storage subsystems. The submissions and the energy transfer awards can be for a time period of a day-ahead electricity market.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

DETAILED DESCRIPTION

I. Introduction

Figure 1:
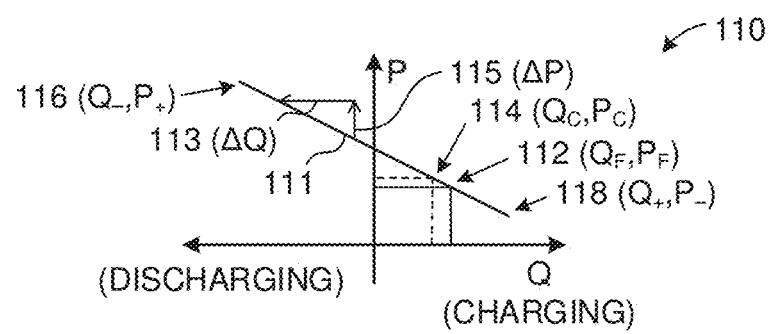
FIG. 1 is a chart illustrating an example bid according to the disclosed technologies.

Power grids incorporating energy storage devices can be regulated using certain examples of the disclosed technology. In some examples, the energy storage devices can include one or more of a battery, a stationary power source, pumped water storage, a flywheel, or a battery-supplemented photovoltaic power system. In further examples, as grid conditions evolve or deviate from forecast, piecewise mappings can be utilized to allocate scheduled energy transfers flexibly dependent on underlying changes in a variable dubbed a medium of energy exchange. Predicted values of the medium of energy exchange can be replaced with actual cleared values of the medium of energy exchange. In some examples, the medium of energy exchange can represented as a price per unit of electrical energy, while in other examples, the medium of energy exchange can be a variable associated with performance of the grid or energy storage. Incentive signals other than price are also possible. These can include payment for performance, credits that can be exchanged for something of monetary value, donations to a charity of choice, "green credits" reflecting reduced emissions, etc. In additional examples, piecewise mappings can be submissions or bids, expressed as a monotonic function of the medium of energy exchange, or as a continuous piecewise linear function. The predicted values can be used to derive a parameter associated with the piecewise mapping. In some examples, the parameter can be a slope of at least part of the piecewise mapping.

Smart energy markets can be managed on the basis of discrete transactions among a variety of market participants. Such markets are termed "transactive markets." A transaction can result from an accepted bid to provide or consume energy. An energy market can be managed in a tiered manner over multiple timescales. Contracts can be used for long-term or predictable transactions. Bidding systems can be used to fill in or address needs at progressively shorter term scales. A day-ahead market can be used to determine energy transactions for the following day, supplemented by hour-ahead and real-time markets. The shorter-term markets can address fluctuations or mispredictions of e.g. energy generation, energy consumption, or weather. The disclosed technologies have been developed for the day-ahead electrical energy market, which can have a diurnal pattern of low and high energy usage periods, but are not limited thereto.

A market over a time window can be organized as separate markets over distinct contiguous time periods within that window, such as 24 one-hour time periods constituting a day-ahead market. That is, distinct bids can be submitted for each time period and each time period can be cleared independently. A market can also be segregated into spatial zones to accommodate transmission limitations between the zones.

Batteries can help match supply and demand to provide smoother operation of an energy grid. When the grid has an oversupply of energy, batteries can take in and store energy locally within the battery. When demand is high, batteries can be called on to release their stored energy onto the grid. As a corollary, batteries can have an effect of stabilizing energy pricing over a day. By addressing peak demand, batteries can bring down peak period pricing. By utilizing energy in oversupply (low demand) periods, energy pricing in such periods can increase. Existing transactive systems were developed in an environment where the amount of battery storage was small, and bidding could be regarded as price taking rather than price forming. However, as battery penetration into energy markets has increased, the batteries themselves can have a significant impact on energy pricing, and the cleared price in an energy market can differ significantly from a predicted price. As a result, a singleton bid for a specific quantity of energy (either charging or discharging) at a specific price might be rejected if the cleared price is above the specified price (for charging) or below the specified price (for discharging). A rejected bid can imply unutilized battery capacity, which can be inefficient for the battery and for the market overall. Additionally, if the cleared price is below the specified price (for charging), the battery can miss an opportunity to have bought additional energy, resulting in sub-optimal operation. And, as a follow-on effect, a battery could have a charging bid in one time period rejected, while a discharging bid in a later time period could be accepted, leaving the battery unable to meet its discharge commitment.

The disclosed technologies address these and other issues by providing for submitting bid as curves of price vs. quantity (or vice versa, both dubbed "price/quantity curve") in which the bid quantities change based on the cleared price, which is unknown at the time of bidding. In its simplest form, a price/quantity curve bid can be a straight, line segment with a non-zero slope specifying a bid quantity of energy transfer as a function of cleared energy price. Further, piecewise linear bids can be supported, including bids having multiple segments, to provide additional price/quantity refinement and advantages as described herein. The disclosed technologies enable bidders to submit price/quantity curve bids and enable aggregators or market operators to accept and act on the submitted bids. Bids can be represented in any practical way, for example as a list of coordinates (Q, P) specifying quantity Q and price P at endpoints of successive segments of a piecewise linear bid.

As described further herein, the price/quantity curve bids allow bids to be fulfilled above or below the energy transfer quantity desired for the battery, so that deviations from a battery's plan can be reduced. The likelihood and extent of a battery's missed commitment can also be reduced. Other benefits can also accrue to the energy market. For example, singleton bids can lead to market inefficiencies and market oscillations, as many batteries employing similar strategies can move in a herd, only bidding on periods forecast to have highest or lowest prices. The presently disclosed price/quantity curve bids allow batteries multiple degrees of freedom to differentiate themselves according to plan and strategy. In simulations, the disclosed technologies can be found to mitigate or avoid oscillations and smoothen demand and supply across periods of weak demand and periods of strong demand. Market disruptions due to mismatches between predicted and cleared energy prices can also be avoided. The gradual redistribution of energy transfers awarded to batteries as cleared energy prices change can improve the efficiency of grid operation, benefitting both batteries and the market overall.

II. Terminology

To facilitate review of the various embodiments, the following explanations of terms are provided. Occasionally, and where clear to a person of ordinary skill in the relevant art from the context, a term may also be used in a different meaning.

As used in this disclosure, the term "agent" refers to an entity that can make bids or receive awards on behalf of a battery. Commonly, an agent can be implemented as a computer program on one or more hardware processors. These processor(s) can be located within a battery housing, co-located on a same premises as the battery, located in proximity to the battery, or located elsewhere on the grid. In some embodiments, agents for multiple distributed batteries can be co-located, such as on the same premises as an aggregator or market coordinator. Where phrasing such as "a battery makes a bid" or "a battery receives an award" is used for convenience, such phrasing can be understood as shorthand for an agent acting on behalf of the battery.

As used in this disclosure, an "aggregator" is an entity in a market environment logically situated between agents of two or more batteries and the market coordinator. An aggregator can collect and consolidate bids received from agents of client batteries, and forward a consolidated bid to the market coordinator. Once a market has cleared, the aggregator can receive a consolidated award from the market coordinator and can unbundle respective awards, if any, for the client batteries.

As used in this disclosure, an "award" or "grant" is a response to a bid indicating acceptance of the bid. For flexible bids described herein, an award can specify a point on the bid. In some instances an award can specify a quantity $Q_A$ at a cleared price $P_C$ that is less (in absolute value) than the bid amount $Q_C$ for the cleared price $P_C$, that is $|Q_A|<|Q_C|$. Such a situation can arise when there is an oversupply of bids at $P_C$, and insufficient bids at a lower price.

As used in this disclosure, a "battery" is a device that can store and release energy over multiple cycles. Commonly, a battery can be coupled to a grid over which energy (in particular, electrical energy) flows between suppliers (energy sources) and consumers (energy loads). A battery can act as both a source and a load at different times. A battery can store energy in a same or different form as the energy flowing in the grid. For example, a supercapacitor can store electrical energy, rechargeable chemical batteries and fuel cells can store chemical energy, a flywheel can store mechanical energy, and a water tank or reservoir can store gravitational energy. All these and other types of batteries can be coupled to an electrical grid through the use of appropriate transducers or conversion circuits (including rectifiers, inverters, generators, or motors). Although batteries can have a principal function of transferring energy to and from the grid, this is not a requirement. An electric car can discharge extra energy in the evening hours when the electricity price is high and the car may no longer be required for travel, and recharge in the pre-dawn hours when electricity price is low. A residential solar system can principally serve domestic needs and can bid to sell excess stored energy to the grid. A residential facility management system can buy energy on winter days when domestic demand can be expected to exceed solar generation capacity, or can sell energy on days when local generation capacity exceeds domestic demand. Any such apparatus or system, or similar apparatuses or system, can have an energy storage function and can be a battery acting either as a supplier to the grid, or as a load on the grid. A group of batteries can be managed as a single battery, or as multiple batteries having respective distinct bids or bidding strategies. A battery can include associated circuitry for monitoring, control, or energy conversion.

As used in this disclosure, "battery characteristics" can include fixed parameters related to a physical battery and its associated circuitry, time-varying parameters related to the physical battery, or "strategy parameters" used in planning and bid generation. Fixed parameters can include battery capacity, maximum charging and discharging rates, charging and discharging energy conversion efficiencies, and/or battery wear and tear costs associated with cycling. Variable parameters can include anticipated state of charge. Strategy parameters can include coefficients controlling a level of aggressiveness, i.e. a willingness to take a risk of being unable to fulfill a bid commitment or a risk of having to compensate in a short-term or real-time energy market. Strategy parameters can also include coefficients indicating a level of conservativeness, i.e. bidding for charging away from the predicted minimum price period or bidding for discharging away from the predicted maximum price period, thereby sacrificing profit margin for a possibility of increasing expected energy throughput and profit. Desired profit margin can also be a strategy parameter.

As used in this disclosure, a "bid" is an offer to buy or sell energy in an energy market. Particularly, bids can be submitted on behalf of a battery to buy energy off the grid and charge the battery therewith, or to sell energy discharged onto the grid. Bids are sometimes dubbed "submissions." Bids that provide different quantities at different prices are termed "flexible" and can be implemented using a bid function with a slope as described herein. Some flexible bids specify a curve indicating a relationship between a cleared energy price and an energy transfer amount at that price, and are dubbed "price/quantity curves."

As used in this disclosure, "charging" refers to a process of extracting energy from the grid and storing it in a battery, while "discharging" refers to a process of releasing energy from the battery, i.e. reducing its stored energy, onto the grid. Charging and discharging processes can be implemented with the help of transducers, rectifying, inverting, or other energy conversion circuits. Particularly, the use of charging and discharging does not imply any particular form of energy storage within the battery.

As used in this disclosure, "clearing" refers to a process in a bidding market for resolving the status of all bids in a pool. A pool of bids can support exchange of a same resource at a same time period according to the constraints of the market. Two bids for different resources, or for different time periods, or at locations isolated from each other cannot support an exchange and can be in different pools. By evaluating bids to supply the resource and bids to consume the resource, a price (the "cleared price") for exchange of the resource can be determined that meets an objective of the market. In some examples, determination of the cleared price can be sufficient to resolve the status of all bids, i.e. determining which bids are accepted and which rejected, or to unambiguously determine awards for all accepted bids. In other examples, the cleared price can leave some uncertainty as to awards, and clearing can require further determination of awards, e.g. to apportion some residual demand among an excess of suppliers at the cleared price. That is, determination of awards can be part of clearing in some situations, but need not be part of clearing in other situations.

As used in this disclosure, the term "controller" refers to a device that can cause energy transfers to occur between a battery and a coupled grid. The controller can be part of a battery package or separate from the battery. Commonly, a controller can be implemented as switches, transducers, or other circuitry controlled by a computer program on one or more hardware processors. The switches, transducers, or other circuitry can be packaged together with, or separate from, the hardware processors. A controller and an agent for a battery can work in concert to support a battery's operations on a grid, the controller facing the battery and the agent facing a market coordinator. In some embodiments, the computer program for the controller and the agent for the battery can be implemented on the same computer system. A controller can control more than one distinct battery.

As used in this disclosure, the term "day ahead" refers to an energy market that receives bid submissions on or by a given day for energy transactions to be conducted the following day. Commonly, the day ahead market can be organized into contiguous distinct periods of time, such as 24 one-hour periods. Often, a day ahead market can clear all time periods together on the same day bids are due, however these are not requirements. In operation, a day-ahead market for September 20 can require bids for all time periods to be submitted at 10 am on September 19, and can complete market clearing for all time periods of September 20 by 1 pm on September 19.

As used in this disclosure, a "dead band" is a portion of a bid where $\Delta Q/\Delta P=0$, away from the endpoints $Q_-$, $Q_+$ of the bid. Q is a bid quantity of energy transfer at a price P.

As used in this disclosure, a "variable" is any quantity that can have multiple possible numerical values, with or without units. The terms "dependent variable" and "independent variable" are used in context of a function. An independent variable is a quantity whose value can be used to evaluate the function. A dependent variable can be a value of the function so evaluated. Often, a value of the independent variable can be required in order to determine a value of the dependent variable. A dependent variable for one function can be an independent variable for another function.

As used in this disclosure, the term "distributed" refers to entities not present at a same location or within a same package. For example, batteries, sources, and loads can be distributed, connecting to a grid at distinct locations. Computer software can be distributed across multiple physical computer systems.

As used in this disclosure, "energy" refers to a physical resource, such as electrical energy, which can be used directly or indirectly to develop power or perform work. A battery can store energy in a form (e.g. chemical energy) that is different from a form (e.g. electrical energy) in which the energy flows in a grid.

As used in this disclosure, "energy transfer" is a process of storing energy into a battery from a grid (charging) or releasing energy from the battery onto a grid (discharging).

As used in this disclosure, the terms "function" and "mapping" refer to a relationship that maps a value of an independent variable to a value of a dependent variable. Particularly, a price of energy can be regarded as an independent variable, and a bid or granted amount of energy transfer can be dependent on the price. The independent variable can have a set of allowed or possible values, which collectively can be termed the "domain" of the function. Correspondingly, the dependent variable can have a set of allowed or possible values which collectively can be termed the "range" of the function. A "monotonic" function is non-decreasing over its entire domain or non-increasing over its entire domain. A monotonic function can include one or more segments, or portions of its domain, over which the independent variable is constant, i.e. the function has zero slope in such segments, such as dead band(s).

As used in this disclosure, a "grid" or "energy grid" is a system of interconnected entities between which energy, particularly electrical energy, can flow. The grid can include energy sources (suppliers of the energy resource), energy loads (consumers of the energy resource), batteries (which can variously act as sources or loads and, particularly, can store energy), transmission facilities, metering facilities, and/or control facilities.

As used in this disclosure, an "independent system operator" (ISO) is an organization that can coordinate, monitor, or control operations (including market operations) of an electrical grid, often over a specified geographic region at the wholesale level, i.e., the transmission grid and bulk generators.

As used in this disclosure, two quantities are said to be "jointly determined" when the procedure to determine the two quantities cannot be separated into independent procedures for each of the quantities, that obtain the same values for both quantities as the original (joint) procedure. Superficially similar expressions such as "determined concurrently" or "determined together" do not necessarily imply such inseparability. The optimization procedure to determine target points ($Q_F$, $P_F$) described herein jointly determines target points $Q_F(t)$ for multiple time periods. However, market clearing to determine cleared energy prices can be performed independently for each time period, in at least some examples, and so would not be considered a joint determination.

As used in this disclosure, the term "linear" refers to a dependence between two variables that can be expressed in the form $y=A \cdot x+B$, where x is an independent variable, y is a dependent variable, and A and B are quantities that do not depend on x or y. Often, A or B can be a constant.

As used in this disclosure, the term "market" can have multiple related meanings generally distinguishable in context. First, a market can be an instance of a mechanism that uses bids to control energy transfers by or among participants. Then, a "market" can collectively refer to multiple such instances, such as "the day-ahead market" or an energy market for a particular grid. The markets of interest in this disclosure are transactive energy markets. A market can use other inputs, such as contracts, in addition to bids. A market can be associated with a grid or other medium on which the energy transfers can be conducted. A "participant" in a market is a party or device that performs energy transactions according to awards from the market. Additionally, the term "market" can also refer collectively to the participants served, a market coordinator, aggregators, or other parties involved in an energy transfer environment.

As used in this disclosure, a "market coordinator" is an entity that performs clearing in a market. In a transactive energy market, the market coordinator can be a utility company on a grid, an ISO, or another party specifically tasked with operating the market.

As used in this disclosure, terms like "optimum," "optimize," "maximum," "maximize," "minimum," or "minimize" refer to selection of one of a number of candidate configurations or values as having a superior property compared to others of the candidates, according to some predetermined criterion. Any number of candidates can be evaluated, even as few as two. Particularly, optimization requires neither perfection nor an infinite search. Due to discrete data representations and finite computation time, an optimization procedure can successfully terminate without finding an exact extremum.

As used in this disclosure, the term "network" refers to a group of two or more computing devices coupled to communicate with each other, and can include any tangible medium over which such communication occurs. In general, the network over which devices on a smart electrical grid communicate can be distinct from the grid itself, although with technologies such as power-line communication (PLC), some overlap is possible. A device that is part of a network can communicate over the network.

As used in this disclosure, "piecewise linear" describes a function that consists of one or more linear segments. That is, a piecewise linear bid can have just one segment, or more than one segment. Common piecewise linear functions can be continuous, meaning that successive segments can be joined end to end with no gaps, however this is not a requirement.

As used in this disclosure, "point" refers to a particular coordinate pair of a function or bid, such as (x, y) or (Q, P).

As used in this disclosure, a "price" is a monetary value of a resource, and can be specified per unit amount of the resource, as price per kWh. A "predicted price" or "forecast price" is an estimate of a price at a given time or time period made at an earlier time. A "cleared price" is an actual price for the resource, often associated with resource transfers occurring at a particular time, and can be determined prior to the particular time. Multiple prices can exist for the same resource at the same time. For example, two contracts, a day-ahead market, an hour-ahead market, and a real-time market can all have different specified or cleared prices for the same resource at the same time. Additionally, in some examples, different pricing can be provided for charging (buying) and discharging (selling) by a battery, that is, a market can have a price spread.

As used in this disclosure, a "price taker" is an entity that does not negotiate a price or contribute to establishment of the price. Insofar as battery bids can influence pricing, batteries can be excluded from price takers. A single battery can have a negligible influence on price, and the single battery can be approximated as a price taker. However, many batteries can collectively exert significant effects on pricing, and a forecast that considers all batteries to be price takers can be significantly in error.

As used in this disclosure, a "segment" is a finite continuous portion of a curve, with two endpoints. A "linear segment" is a segment of a straight line.

As used in this disclosure, the term "slope" refers to the rate of change of a dependent variable with respect to an independent variable.

As used in this disclosure, the term "source" refers to an entity that supplies energy to a grid, and "load" refers to an entity that consumes energy from the grid. A battery can be both a source and a load at different times.

As used in this disclosure, a "time period" is a contiguous interval of time, often within a market cycle. For example, a day-ahead market has a cycle or periodicity that is one day long, and the one day can be divided into 24 consecutive one-hour periods. An hour-ahead market can be divided into 12 consecutive five-minute periods.

As used in this disclosure, the term "transactive" refers to an energy market that is controlled based upon transactions between distributed participants.

As used in this disclosure, the terms "utility" or "electric utility" pertain to a company that primarily engages in generation, distribution, transmission, or brokering of a utility resource such as electricity. That is, these terms can encompass electric service providers, distribution system operators, or transmission system operators. A given energy market can be served by more than one utility. A utility can engage in providing electric service to other entities, i.e., delivering electricity to wholesale or retail customers.

III. An Example Bid

FIG. 1 is a chart illustrating an example bid 110 according to the disclosed technologies. The independent variable, a medium of energy exchange P, is shown along the vertical axis, and the dependent variable, quantity Q of energy transfer, is shown along the horizontal axis. Positive values of energy transfer Q correspond to charging a battery, i.e. the battery buys energy from a market or market suppliers and stores it, while negative values of energy transfer Q correspond to discharging the battery, i.e. the battery sells stored energy to the market or market loads. In some examples herein, the medium of energy exchange quantity is illustrated as a price. However, as described herein, this is not a requirement, and other mediums of energy exchange can be used.

Bid 110 is in the form of a line segment 111 which passes through point 112 ($Q_F$, $P_F$). Ordinate $P_F$ represents a predicted value of the medium of energy exchange (e.g. predicted price), while abscissa $Q_F$ represents the target energy transfer at the predicted price $P_F$, as determined by a bidding model for the battery. Bid 110 can be regarded as anchored to the target point 112 ($Q_F$, $P_F$). In this illustration, the predicted price $P_F$ can be fairly low, and the battery seeks to buy energy (positive value of $Q_F$) at the predicted price $P_F$.

The bid 110 also has a slope. Because P is the independent variable, the slope can be considered to be $\Delta Q$ 113 divided by $\Delta P$ 115, rather than the other way around. As illustrated, $\Delta P$ 115 is positive, while $\Delta Q$ 113 is negative, meaning that the slope $\Delta Q/\Delta P$ is negative. Negative slope bids are common for batteries viewed as purchasers (that is, positive quantity Q for charging, negative Q for discharging): as the price goes down, the battery can likely purchase more energy. At the other end of the bid, as the price goes up, the battery can likely sell more energy. Generally, a single battery's bids 110 for respective time periods can have different target points 112 and a same slope (following Equation (2)), and can be vertically offset from one another, however this is not a requirement. In some examples, a battery can submit bids having identical line segments for all time periods, with target point 112 moving along the piecewise linear bid as the predicted price varies. In other examples, aspects of the bidding strategy can cause different slopes to be used at different time periods. For example, early in a group of low-predicted-price periods the battery can be unwilling to take much price risk (high absolute value of slope $\Delta Q/\Delta P$), while in later periods the battery can be more willing to take price risk to ensure meeting its charging plan (low absolute value of $\Delta Q/\Delta P$). Similar considerations can apply over a group of high-demand high-predicted-price discharging periods.

The slope of the bid 110 gives the battery flexibility to adjust its bid according to the clearing price. Thus, if the clearing price $P_C$ is greater than the predicted price $P_F$, the battery can bid for and purchase a quantity of energy $Q_C$ less than the target amount $Q_F$. Point 114 illustrates the cleared or granted energy transfer ($Q_C$, $P_C$) which is different from the target point 112. If the clearing price $P_C$ is sufficiently high, the battery bid can reach zero energy transfer and can even go over to the discharging side. To illustrate, if a large provider stays out of the energy market, a lower than expected supply can drive up the cleared energy price, and the battery can help to fill the shortfall by selling energy at the higher price. Conversely, if a large consumer stays out of the market, a glut of available energy can drop the cleared price, and the battery can help to take up the excess by buying more energy at the lower price. In these ways, the slope bid 110 can help to satisfy both the market needs (efficient, stable grid operation) and the battery's goal (buy low, sell high).

The bid 110 can be specified in various ways. As an alternative to using the target point 112 ($Q_F$, $P_F$) and slope $\Delta Q/\Delta P$, the bid 110 can be specified by the endpoints 116 ($Q_-$, $P_+$) and 118 ($Q_+$, $P_-$), of line segment 110. The notation $P_-$, $P_+$ refers to the minimum and maximum values of price P along the line segment 111, and similarly for $Q_-$, $Q_+$. Such a representation provides extensibility for more complex piecewise linear bids described herein.

IV. A First Example Method

Figure 2:
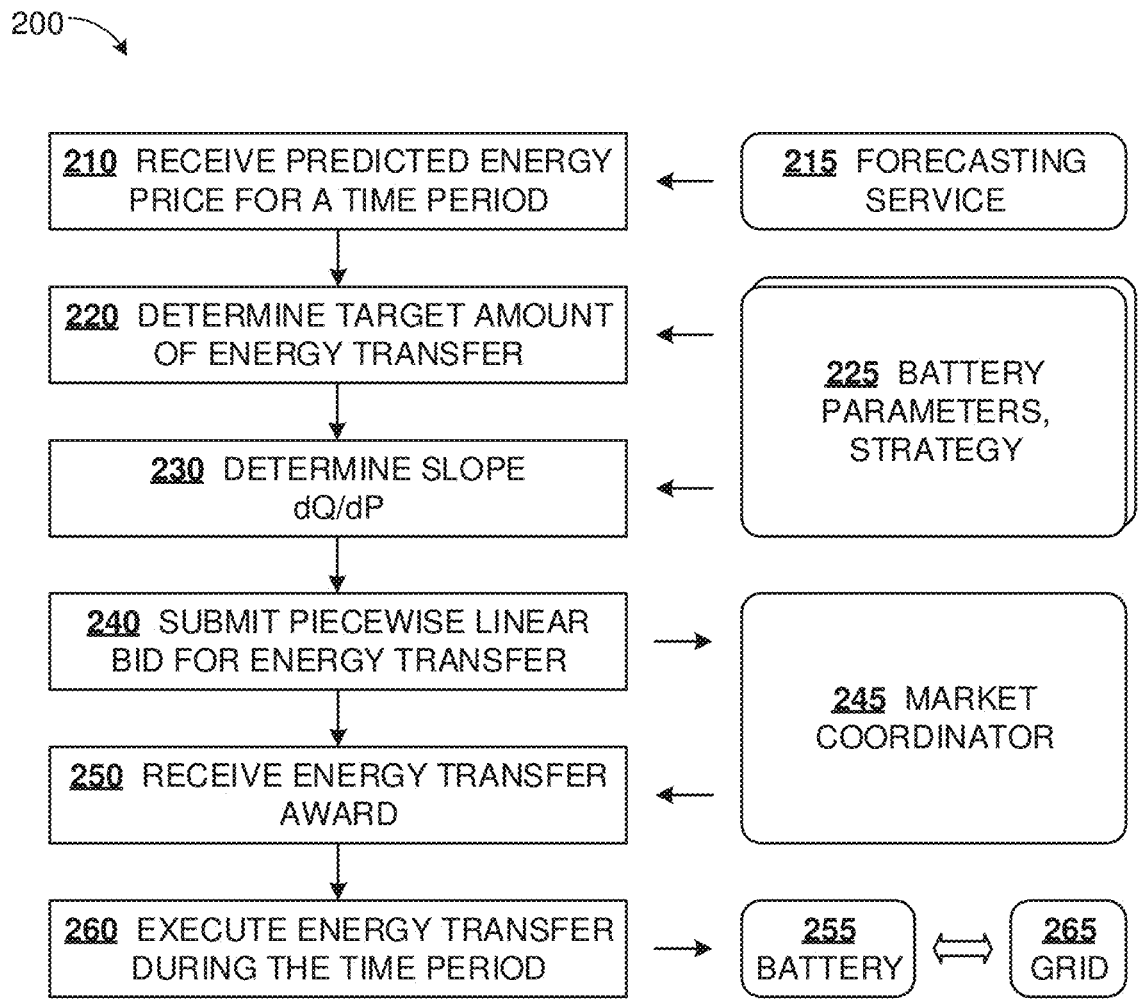
FIG. 2 is a flowchart of a first example method according to the disclosed technologies.

FIG. 2 is a flowchart 200 of a first example method according to the disclosed technologies. This method illustrates regulation of energy transfer between a battery and a power grid for a time period, in which energy transfer amounts are mapped from a medium of energy exchange. For convenience of illustration, the medium of energy exchange is described as a price in FIG. 2, but this is not a requirement. For example, the medium of energy exchange can be, or can be dependent on, a state of charge of a battery or a system load in the power grid. In other examples, energy transfers can be structured as swaps between time periods, and the medium of energy exchange can be an energy transfer amount in a different time period. Incentive signals other than price are also possible. These can include payment for performance, credits that can be exchanged for something of monetary value, donations to a charity of choice, "green credits" reflecting reduced emissions, etc.

Thus, FIG. 2 illustrates generation and submission of a bid for a battery 255 to participate in a forward energy market 245, and can be performed by an agent and controller that are part of a battery system or that can act on behalf of the battery 255. This method describes determination of the components of a bid and submission of the bid into a market 245, for a given time period in the future.

At process block 210, a predicted energy price $P_F$ for a given time period can be received. The predicted price $P_F$ can be obtained from a forecast supplier such as forecasting service 215. At process block 220, a target amount $Q_F$ of energy transfer can be determined, based on the predicted price. Thus ($Q_F$, $P_F$) could constitute a singleton bid. However, in order to account for variations between the predicted price and the actual price at which the forward energy market clears, it can be desirable to extend the bid to cover a spread of possible prices, or other possible energy exchange quantities. To this end, a parameter can be calculated indicating a change in energy transfer amount per unit change in a cleared value of the medium of energy exchange. As indicated in FIG. 2, this parameter can be a slope $\Delta Q/\Delta P$, which can be calculated at process block 230. The slope can represent a change in bid quantity Q per unit change in the cleared energy price P. The target point ($Q_F$, $P_F$) and the slope $\Delta Q/\Delta P$ can define a straight line, a bid such as 110 of FIG. 1 can be created. The determination of target point ($Q_F$, $P_F$) and slope $\Delta Q/\Delta P$ can depend on a variety of parameters 225 including battery characteristics and strategy parameters.

Based on the target amount of energy transfer and the determined parameter, a piecewise mapping can be submitted for the given time period. For example, at process block 240 of FIG. 2, a piecewise linear bid can be submitted for the given time period. The piecewise linear bid can have a single linear segment, such as illustrated in FIG. 1, or can have additional segments as described further herein. The bid can be submitted directly to a market coordinator 245, or indirectly via an aggregator.

With all bids in hand, the market coordinator 245 can clear the market for the given time period and an energy award for the battery can be determined, either directly by the market coordinator 245 or indirectly via an aggregator. Thus, at process block 250, the energy transfer award for the given time period can be received. When the given time period arrives, the awarded energy transfer can be executed between battery 255 and a grid 265 served by the market 245, at process block 260. In examples, process blocks 210-250 can be performed by an agent of the battery 255, while process block 260 can be performed by a controller of the battery 255.

Numerous variations can be employed. In some examples, multiple forecasting services 215 can be available. Forecast providers can include third parties including specialized weather forecasters, a utility, or a market coordinator. The first method can include selecting a forecast service 215 from which to obtain predictions.

V. An Example Data Structure

Figure 3:
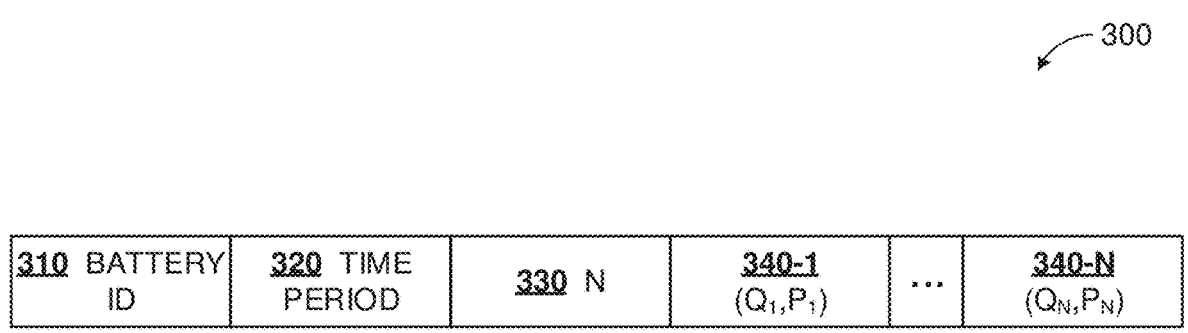
FIG. 3 illustrates a data structure representing a bid according to some examples of the disclosed technologies.

FIG. 3 illustrates a data structure 300 representing a bid according to some examples of the disclosed technologies. The structure 300 is shown as a record having multiple fields.

Field 310 identifies the battery making a bid. This identifier can be a number, such as a serial number, a string, such as a name, or a structured identifier, such as a dotted hexadecimal Internet Protocol (IP) address. The identifier can have local scope on a grid or within an energy market, or can be a universally unique identifier (UUID).

Field 320 identifies the time period for which the bid is made, and can be a relative identifier, e.g. indicating hour number 3 for a known day for which bids are being collected. Alternatively, the time period can be identified absolutely, using e.g. a computer style time encoding starting from Jan. 1, 1900; Jan. 1, 1970; or another epoch.

Field 330 indicates a number N of points defining a piecewise mapping, such as a piecewise linear bid. The value of N can extend from 2 to a predefined limit such as any integer from 3 to 100, or an even higher limit. The points themselves can be provided as fields 340-1 to 340-N, each point J including a pair of numbers representing $(Q_J, P_J)$. In some examples, Q can be an amount of energy transfer to be scheduled as a function of a medium of energy exchange P, which can be a cleared price.

Alternative data organization or representation can be used. In some examples, a bid can be provided with separate portions indicating a charging side of the bid (Q>0) and a discharging side of the bid (Q<0). In other examples, a bid can be provided with reference point (e.g. $(Q_F, P_F)$) and slope of successive line segments. In further examples, bids for multiple periods (e.g. 24 1-hour periods of the immediately following day) can be packaged together in a single structure, having fields similar to 340-1 to 340-N for each of the various time periods concatenated together, or organized as rows of a table.

VI. Further Example Bids

FIGS. 4A-4G are charts illustrating further example bids. Generally, these bids incorporate additional linear segments to achieve various objectives.

Figure 4A:
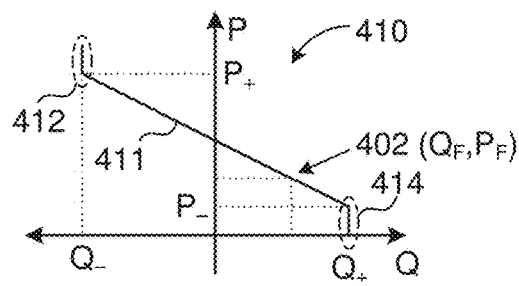
FIGS. 4A-4G are charts illustrating further example bids according to the disclosed technologies.

The bid 410 of FIG. 4A is similar to bid 110 described herein. Bid 410 includes a line segment 411 extending from a minimum energy transfer $Q_-$ (maximum discharge) to a maximum energy transfer $Q_+$ (maximum charging), passing through a target point 402 ($Q_F$, $P_F$), and having a slope $\Delta Q/\Delta P$. In some examples, the endpoints $Q_-$, $Q_+$ can be limited by ratings of the battery or its wiring to the grid. Additional linear segments 412, 414 can provide clipping of the sloping bid at these maximum ratings $Q_-$, $Q_+$. Segment 412 extends from $(Q_-, P_+)$ to $(Q_-, P_\infty)$, where $P_\infty$ can be a regulatory price cap in the market or some other large price value. Segment 414 extends from $(Q_+, P_-)$ to $(Q_+, P_0)$, where $P_0$ can be zero, a minimum price support, or some other lower price limit. Although uncommon, negative prices are not precluded by the disclosed technology.

In some examples, the segments 412, 414 can be explicitly indicated in a bid, while in other examples, the segments 412, 414 can be inferred from the segment 411 having ends at $(Q_-, P_+)$ to $(Q_+, P_-)$. The explicit representation or inference of segments 412, 414 can be a matter of convention in a particular embodiment.

Figure 4B:
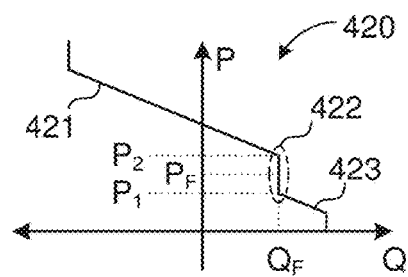

Bid 420 of FIG. 4B is similar to bid 410 described herein, and further introduces the concept of dead band. Target quantities $Q_F$ for a sequence of time periods can be arranged according to a plan. In some scenarios, deviations from the plan can result in the battery running short of its supply commitments or having insufficient storage for its charging bids. Deviations can require remediation in shorter-term or real-time markets, or can incur costly penalties. Thus, to avoid expensive penalties or remediation, it can be desirable to adhere to the plan even at the cost of losing some price optimization. The dead band 422 of bid 420 provides such a feature. The dead band 420 can have slope $\Delta Q/\Delta P=0$, and can extend above and below the target point $(Q_F, P_F)$, so that small deviations in the cleared price $P_C$ from the predicted price $P_F$ do not impact the bid or awarded quantity $Q_C=Q_F$. Effectively, dead band 420 can split the linear segment 411 of FIG. 4A into two linear segments 421, 423 offset from each other.

The dead band 420 can be symmetric about the target point ($Q_F$, $P_F$) or asymmetric, and can even be one-sided. Inasmuch as a shortfall of stored energy can be a bigger problem than oversupply, a dead band 420 with lower limit at the target point ($Q_F$, $P_F$) can be used (i.e. $P_1=P_F$), so that the battery can be protected against a higher cleared price, but can still take advantage of a lower price to increase its purchase.

In general, a dead band can be described as two points $(Q_D, P_1)$, $(Q_D, P_2)$ that share a value of the bid amount $Q_D$ (in the illustrated example $Q_D=Q_F$) at distinct values $P_1$, $P_2$ of the cleared energy price. The bid amount $Q_D$ of the dead band can be away from the ends of the bid, that is, $Q_-<Q_D<Q_+$. In other words, endpoints $(Q_-, P_+)$ to $(Q_+, P_-)$ can have bid amounts $Q_-, Q_+$ that are respectively less than and greater than the bid amount $Q_D$ of the dead band.

Figure 4C:
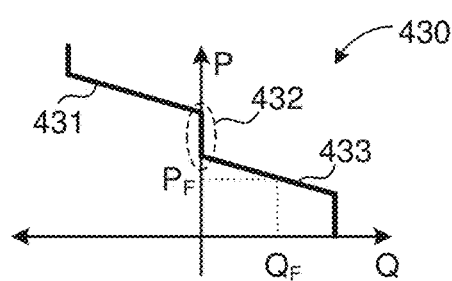

Bid 430 of FIG. 4C illustrates a different dead band 432 positioned at Q=0. Dead band 32 shifts energy discharges to a higher price and/or shifts energy charging to a lower price.

The additional spread between discharging and charging prices can provide a consistent component of gross profit to compensate for e.g. battery wear and tear. The dead band 432 can split the linear segment 411 of FIG. 4A into two offset segments 431, 433. As illustrated, segment 433 passes through the target point ($Q_F$, $P_F$).

Figure 4D:
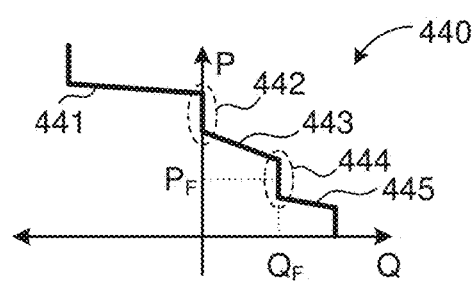

While dead band 422 can also compensate for wear and tear, in some examples two dead bands can be used, as shown in bid 440 of FIG. 4D. Dead band 442 at Q=0 and dead band 444 at $Q=Q_F$ separate segments 441, 443, 445 having non-zero slopes ΔQ/ΔP. Bid 440 also illustrates segments 441, 443, 445 having different slopes, to increase or reduce sensitivity to price variations in different zones.

Figure 4E:
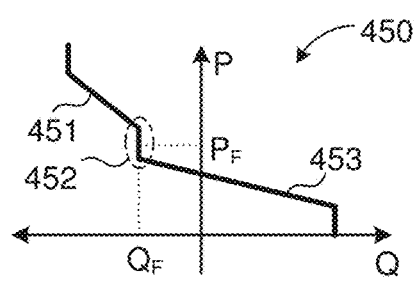

Bid 450 of FIG. 4E illustrates a situation where the predicted price places the optimized target energy transfer amount $Q_F$ at the predicted price $P_F$ in the discharging zone. Bid 450 incorporates a dead band 452 at $Q=Q_F$, separating sloping segments 451, 453.

Figure 4F:
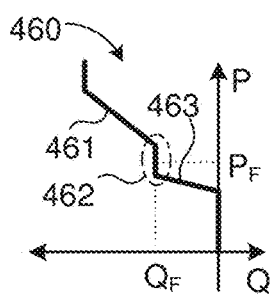

Bid 460 of FIG. 4F illustrates a situation of a battery seeking to act only as an energy supplier for a given time period. Such a situation could arise if the battery has a plan to be fully charged at the beginning of the given time period. Bid 460 includes a dead band 463 at Q=QF, separating linear segments 461, 463 having different slopes.

Figure 4G:
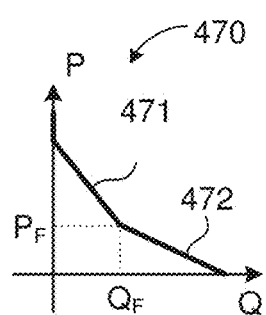

Conversely, bid 470 of FIG. 4G illustrates a situation of a battery seeking to act only as an energy consumer for a given time period. Such a situation could arise if the battery has a plan to be nearly or fully discharged at the beginning of the given time period. Bid 470 has no dead band, however linear segments 471, 472 can be continuous at the target point (QF, PF). As illustrated, the slope of segment 471 is smaller than the slope of segment 472, indicating that a shortfall of energy transfer ($Q<Q_F$) could be a greater concern for the battery's plan than a surfeit of energy. Bids 460, 470 can be dubbed "one-tail bids."

VII. An Example Scenario

Figure 5A:
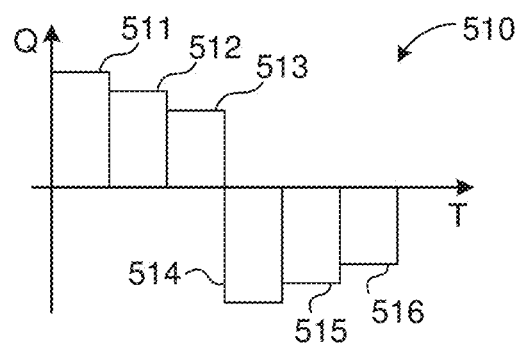
FIGS. 5A-5C are charts illustrating an advantageous aspect of the disclosed technologies.
Figure 5B:
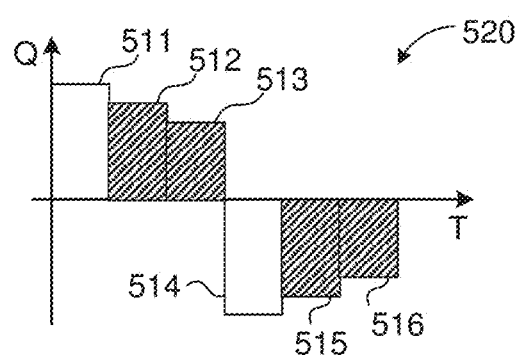
Figure 5C:
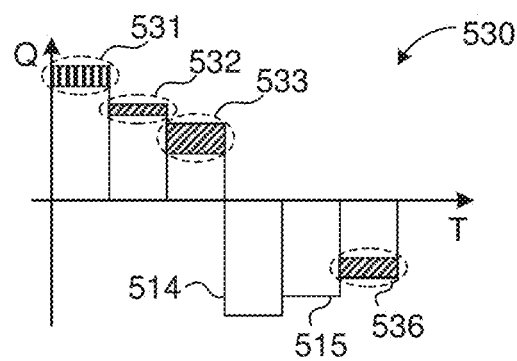

FIGS. 5A-5C are charts 510, 520, 530 illustrating an advantageous aspect of the disclosed technologies. The charts show bid energy transfer amounts Q on the vertical axis, and six successive time periods on the horizontal T axis.

Chart 510 of FIG. 5A illustrates a baseline case. Bids for amounts 511-516 in successive time periods can be fully realized. The battery charges up by 511+512+513 during the first three periods, providing enough stored energy so that its discharge awards 514+515+516 can be met.

Chart 520 of FIG. 5B illustrates a similar scenario under conventional singleton bidding. The bid for 511 in the first time period can be satisfied fully, but the bids 512, 513 in succeeding time periods can be rejected. The shaded portions of 512, 513 show a complete shortfall in both time periods: because these bids are rejected, no energy at all can be provided to the battery for these time periods. Thus, entering the three discharge periods, the battery has enough stored charge to satisfy 514, but none left over for 515, 516, leading to complete shortfall as the battery is unable meet its commitments in these periods. Substantial remediation may be required, or substantial penalties may be incurred.

Chart 530 of FIG. 5C illustrates a similar scenario with the disclosed technologies. During the first charging phase, the cleared price can be a little below the predicted price, as a result of which the battery acquires a little extra charge as indicated by the vertically hatched area 531. During the next two charging phases, the cleared price can exceed the predicted prices. However, instead of missing the charging opportunity completely, the battery acquires charge with only modest shortfalls 532, 533. Thus, during the first discharge phase, the battery has sufficient charge to meets its commitment 514. In the second discharge phase, the shortfall 532 can be offset by extra charge 531, and the commitment 515 can also be fully met. The little extra charge leftover from 531 also partially offsets the shortfall 533, so that the shortfall 536 in discharge commitment can be less than the charging shortfall 533. Thus, the required remediation or incurred penalties can be far less than for the scenario of FIG. 5B.

VIII. A Second Example Method

Figure 6:
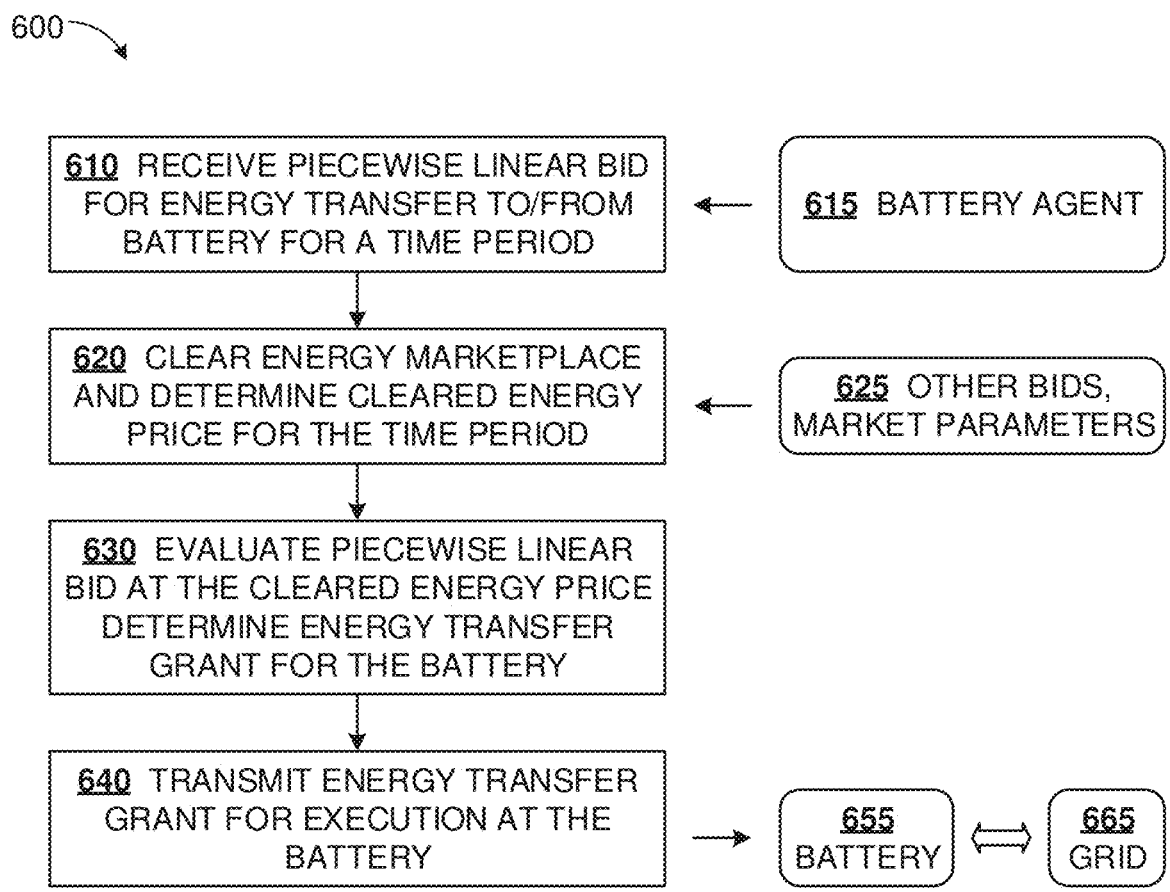
FIG. 6 is a flowchart of a second example method according to the disclosed technologies.

FIG. 6 is a flowchart 600 of a second example method according to the disclosed technologies. This method illustrates operation of a forward energy market for a grid 665, and can be performed at a market coordinator.

A bid can be received at process block 610. The received bid can be a piecewise linear bid on behalf of a battery 655 on the grid 665, for an amount of energy to be transferred to or from the battery in a given future time period. The piecewise linear bid can include one or more linear segments. The piecewise linear bid can define the bid amount of energy transfer Q as a function of cleared energy price P. At least one of the segments can have a non-zero slope, e.g. ΔQ/ΔP≠0. The piecewise linear bid can span a range from $Q_-<0$ (a battery discharging energy transfer) to $Q_+>0$ (a battery charging energy transfer). The piecewise linear bid can be received from an agent 615 of the battery.

At process block 620, the energy marketplace can clear for the given time period, meaning that supply bids (e.g. for discharging a battery) and optionally other supply inputs can be balanced against demand bids (e.g. for charging a battery) and optionally other demand inputs, to determine a price (the cleared energy price) at which supply and demand can be balanced. The clearing can be based in part on the piecewise linear bid received at block 610, on other bids from other batteries or other market participants, or on other market parameters such as grid topology and attendant transmission constraints. The cleared energy price can be used to settle bids and determine corresponding awards to be made.

At process block 630, the piecewise linear bid can be evaluated at the cleared energy price to determine an award for energy transfer by the battery during the given time period. At process block 640 the energy transfer award can be transmitted for subsequent execution at the battery 655.

Numerous variations can be employed. The given time period can be an hour within a day ahead period. Bids for multiple time periods can be received together or can be cleared concurrently. Where multiple batteries participate in the market, some or all of the batteries can submit piecewise linear bids as described herein, or some batteries can submit singleton bids or another form of bid. In addition to batteries, market participants can include an electric utility, a load operator (e.g. an industrial facility), or an aggregator.

IX. An Example Sequence Diagram

Figure 7:
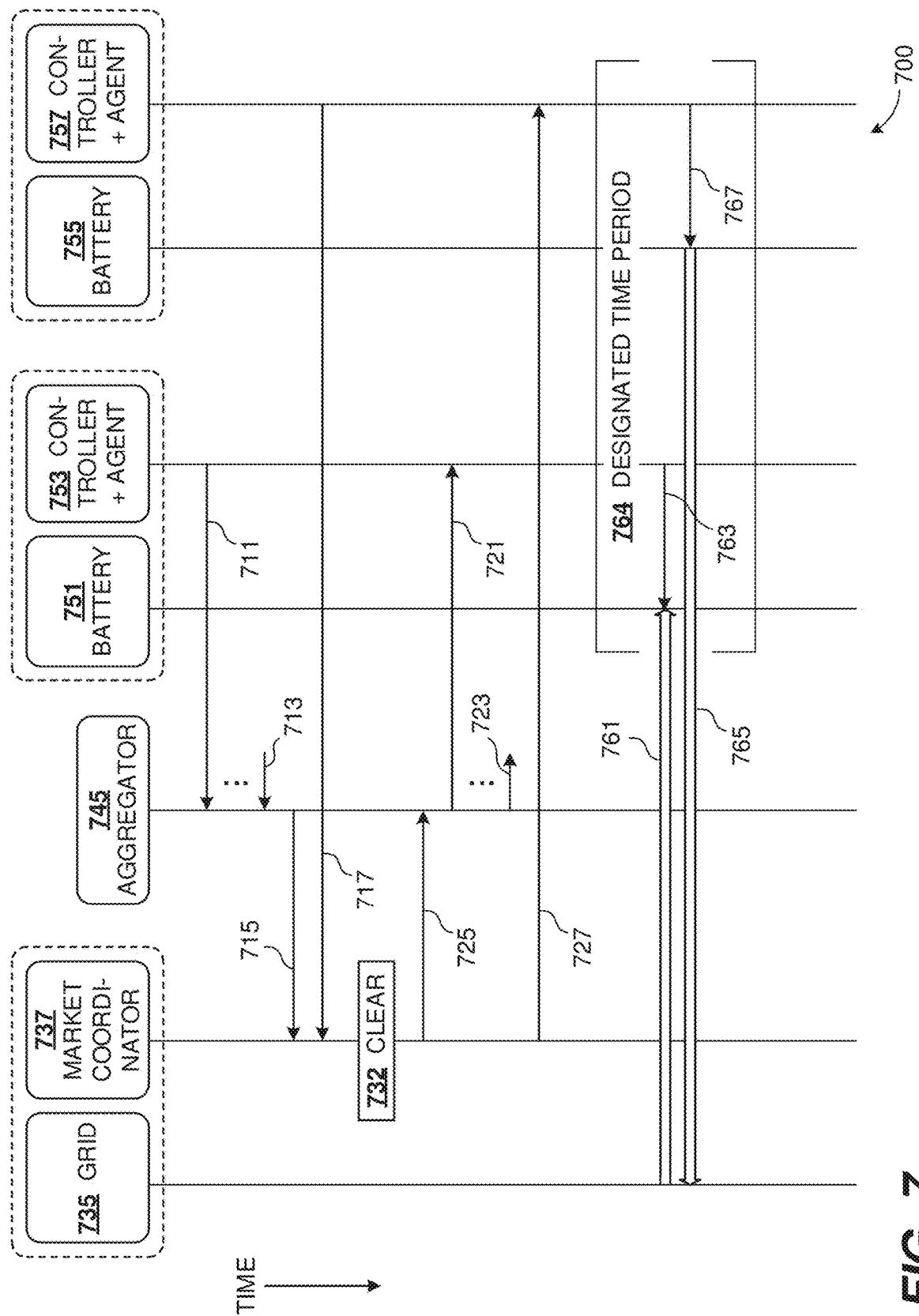
FIG. 7 is a sequence diagram illustrating some examples of the disclosed technologies.

FIG. 7 is a sequence diagram 700 illustrating some examples of the disclosed technologies. Batteries 751, 755 are coupled to respective controllers and agents 753, 757. For simplicity of illustration, the controllers and agents 753, 757 are depicted as single actors for each battery in FIG. 7. Other actors in sequence diagram 700 include a market coordinator 737 for a grid 735, and an aggregator 745. Time as depicted generally flows downwards, although actions independent of one another can sometimes be performed concurrently or in an order different from that shown.

During a first phase, bids can be collected at the market coordinator 737. Agent 757 can submit a bid for battery 755 directly to the market coordinator 737, as shown at arrow 717. Meanwhile agent 753 can submit a bid for battery 751 to aggregator 745, as shown at arrow 711. Aggregator 745 can also receive bids for other batteries, as shown by arrow 713. In turn, aggregator 745 can consolidate its received bits into a single bid 715, which can be forwarded to the market coordinator 737.

In a second phase, with all bids in hand, the market coordinator 737 can perform a clearing operation and can determine energy transfer awards at 732, as described herein.

In a third phase, energy transfer awards can be issued to various battery agents. Arrow 737 depicts an award for battery 755 being transmitted directly to the battery's coupled agent 757. Arrow 725 depicts an award for the batteries utilizing aggregator 745 being transmitted to the aggregator 745, where the award can be unpacked for various client batteries of the aggregator 745. Arrows 721, 723 depict the unpacked awards being transmitted to agent 753 (for battery 751) and to other battery agents. In some situations, a bid can result in an award of no energy transfer ($Q_C=0$), which can be transmitted as a zero award in some examples, or can simply not be transmitted in other examples.

In a fourth phase, time advances to the designated time period 764, which causes at least controllers 753, 757 to activate (arrows 763, 767) energy transfers for their respective batteries 751, 755. As illustrated by arrows 761, 765, battery 751 charges from the grid 735, while battery 755 discharges onto the grid 735. Depending on the particulars of the bids and the clearing, other transfers can be executed. In examples having controller and agent 753 implemented separately, an instruction or message to execute transfer 761 can be transmitted from the agent to the controller (not shown), and similarly between controller and agent 757.

X. An Example Environment

Figure 8:
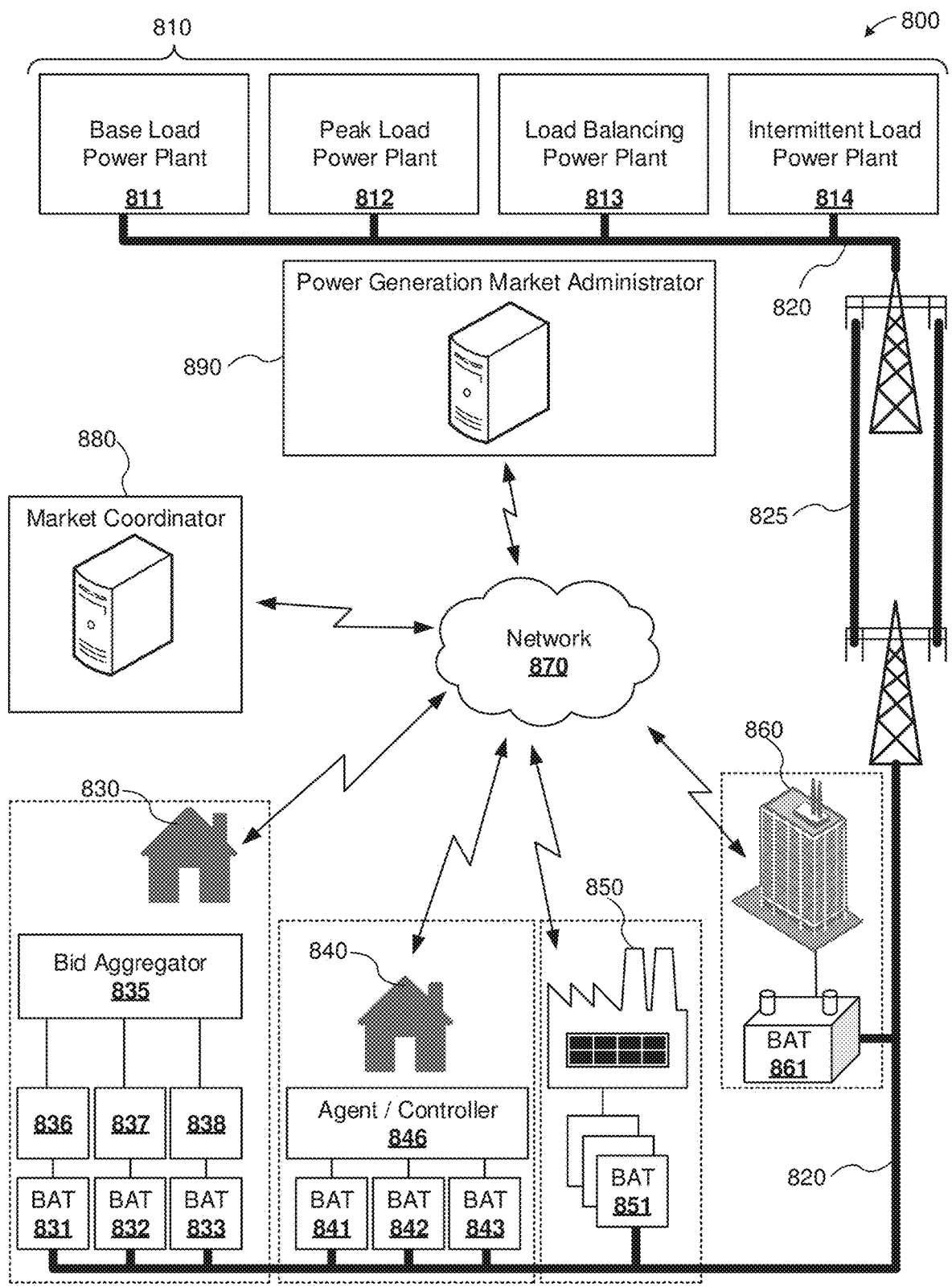
FIG. 8 illustrates an example environment in which some disclosed apparatus and methods can be implemented.

FIG. 8 illustrates an example environment 800 in which some disclosed apparatus and methods can be implemented. As shown, a number of energy sources 810, including a base load power plant 811 (e.g., a coal, nuclear, or hydroelectric power plant), a peak load power plant 812 (e.g., a gas or diesel turbine electric generator), a load balancing power plant 813 (e.g., pumped water storage or battery energy storage plants), and an intermittent load power plant 814 (e.g., including photovoltaic and other solar-based electric generators, wind turbines, and tidal energy sources) can be coupled to a power grid 820. The classification of energy sources 810 is for illustrative purposes: energy sources 810 are not limited to those illustrated, nor are any particular ones of power sources 811-814 required.

The power grid 820 can include transmission lines 825 that carry power from the energy sources 810 to a number of battery devices, loads, or other devices. Market participants with batteries suitable for implementing the disclosed technologies can include residential customers, including residential customers 830, 840, industrial facilities, such as industrial facility 850, and commercial organizations, such as commercial organization 860. Each of the associated customers 830, 840, 850, 860 can be associated with one or more batteries. For example, the residential customer 830 can have three batteries (BAT) 831-833. Further, as shown, each of the batteries 831-833 can be coupled to a respective controller-and-agent 836-838. Each of the agents 836-838 can submit bids and receive clearing prices via aggregator 835, and the counterpart controller 836-838 can engage its respective coupled battery 831-833 on the grid 820 (e.g., by activating rectifier, inverter, or switching circuits (not shown)) to transfer energy between the battery 831-833 and the grid 820. Additionally, residential customer 840 can have a number of batteries 841-843 that can be coupled to a single agent-and-controller 846. The agent 846 can submit bids, receive clearing prices, and the counterpart controller 846 can cause any of the coupled batteries 841-843 to exchange energy with the grid 820. Industrial consumer 850 can have a number of batteries (e.g., battery 851) (controller, agent, or any bid aggregator being omitted from FIG. 8 for simplicity), and commercial consumer 860 can have a number of batteries (e.g., 861); controller, agent, or any bid aggregator being omitted from FIG. 8 for simplicity. The bids can be flexible bids as described herein.

Each of the batteries can be coupled to an agent that is operable to submit data to and receive data from other components via a communication network 870. In some examples, a number of batteries associated with a single customer can have data aggregated and bids submitted together using a bid aggregator (e.g., aggregator 835). In some examples, one or more of the battery agents or controllers can be implemented using a microcontroller, memory, and suitable input/output resources for receiving signals carrying sensor data local to the battery and controlling the coupled battery (e.g., by actuating charging, discharging, rectification, inversion, or switching circuitry coupled to a respective battery). In other examples, battery agents or controllers can be implemented using programmable logic or a general-purpose computer configured to receiving signals carrying signal data and generate signals for controlling the coupled battery.

Each of the batteries can be coupled to, for example, computing devices having computer hardware that runs software or is otherwise configured to communicate with other computing devices accessible by the network 870. In other examples, the batteries send data to other computing devices associated with one or more of the energy consumers. Each of the controllers coupled to or associated with the batteries, market coordinator 880, or power generation market administrator 890 can have computer architecture(s) similar to those illustrated in FIG. 10 and further discussed below. The computing devices associated with the batteries, the coordinator, and the administrator are not limited to traditional personal computer or server architectures, but can utilize other computing hardware configured to connect to and communicate with the network 870 (e.g., specialized computing hardware associated with an electrical device or a power generator, including hardware comprising one or more integrated circuits such as ASIC or programmable logic devices configured to perform any of the disclosed methods).

As shown in FIG. 8, each of the energy customers 830, 840, 850, 860 can send or receive data via the network 870 to/from the market coordinator 880. The market coordinator 880 can receive bid data from energy customers 830, 840, 850, 860, can clear the market, and can transmit clearing prices or energy transfer awards back to agents of the batteries at the energy customers 830, 840, 850, 860. The market coordinator 880 can also communicate with a power generation market administrator 890 in order to, for example, receive wholesale energy price data from producers associated with the energy sources 810. Before each market clearing cycle, each device can evaluate predicted prices and its own battery characteristics to prepare and submit a bid to the market coordinator 880. In some situations, only a subset of the illustrated batteries are activated for energy transfer, even with the flexible bidding described herein. The market clearing cycle can be repeated periodically (e.g., once a day to clear 24 one-hour slots of a day-ahead market).

In the illustrated environment of FIG. 8, controllers coupled to the batteries can be accessed using the network 870, which can be implemented as a local area network (LAN) using wired networking (e.g., using IEEE standard 802.3 or other appropriate wired networking standard), fiber optic cable, cable modem (e.g., using the DOCSIS standard), or wireless networking (e.g., IEEE standards 802.11a-802.11be (including Wi-Fi 6, Wi-Fi 7), 802.16 (WiMax), a metropolitan area network (MAN), cellular telephony (e.g. Long Term Evolution (LTE)), satellite networking, microwave, laser, or other suitable wireless networking technologies). In certain examples, at least part of the network 870 includes portions of the internet, public telephone network, or a similar public network. In certain examples, at least part of the network 870 can be implemented using a wide area network (WAN), a virtual private network (VPN), or other similar public and private computer communication networks. In some examples, controllers associated with the batteries can be located at or near a transmission node of the power grid 820 itself (e.g., in a distribution substation, subtransmission substation, transmission substations, or other nodal locale) or can alternatively be located remotely from the transmission node (e.g., at a centralized location such as using a central computing device that performs computations from multiple transmission nodes). In some examples, controller associated with the batteries can be coupled directly to the battery, or can be located at another location within a residence, industrial building, or commercial building.

XI. An Example of Clearing

A market clearing can have diverse objectives, and can be performed by diverse techniques. One goal can be to maximize the amount of energy transferred. Such a goal can be met by comparing cumulative bids on the supply side with cumulative bids on the demand side to arrive at a clearing price. If the clearing price is too high, supply can exceed demand, and bids of excess suppliers can remain unmet. As the clearing price drops, more energy transfer bids can be executed and the excess supply can drop. However, if the clearing price is too low, demand can exceed supply, and a supply shortfall can prevent further increase in energy transfer and can even cause total energy transfer to drop. Maximum energy transfer can be achieved at a cleared energy price where cumulative supply matches cumulative demand. This can be found graphically as the intersection of the cumulative supply and cumulative demand curves. Numerical solution of the equation Cumulative_Supply=Cumulative_Demand can also be straightforward.

The flexible bidding described herein lends itself to such analysis. By summing the piecewise linear bids for each price, a cumulative battery bid can be obtained. For example, if two batteries have bids $Q_1=4-P$ and $Q_2=5-2P$ from P=0 to P=10, then summing the two bids yields $Q_{1+2}=9-3P$. More batteries can readily be added. Absent other participants in the market, equating supply and demand can be done by setting the net energy transfer to zero, meaning that total energy charged into batteries equals total energy discharged by batteries. In the simple illustration here, $Q_{1+2}=0$ when P=3, at which point $Q_1=1$ (a charging of one unit of energy) and $Q_2=-1$ (a discharge of one unit of energy).

In a general case, bids or contracts of other market participants can be summed with the cumulative batteries' bid. In some examples, a double-sided bid graph (covering both supply to be placed onto the grid, and load to be taken from the grid) can be used, similar to the simple two battery illustration above, and solved for net energy transfer equal to zero. In other examples, the cumulative battery bid graph can be separated into a supply graph and a demand graph, which can respectively be combined with bids of other suppliers and other loads, following which supply and demand can be equated to determine the cleared energy price. Such a clearing technique is straightforward and can be accomplished without computation-intensive iterations.

In other examples, numerous other clearing procedures are available and can be adapted for use with the disclosed technologies. Some such procedures include, without limitation, a variety of power auction designs, including those dubbed first-price sealed-bid, pay-as-bid, descending clock, combinatorial, or two-sided.

In further examples, a different goal can be used, such as maximizing social welfare. Welfare maximization can entail prioritizing some loads or suppliers over others, and is not discussed further herein. Constraints, such as transmission line constraints, distribution network constraints, substation constraints, or feeder power constraints, can also play a role in how a market clears.

XII. An Example Dataflow Diagram

Figure 9:
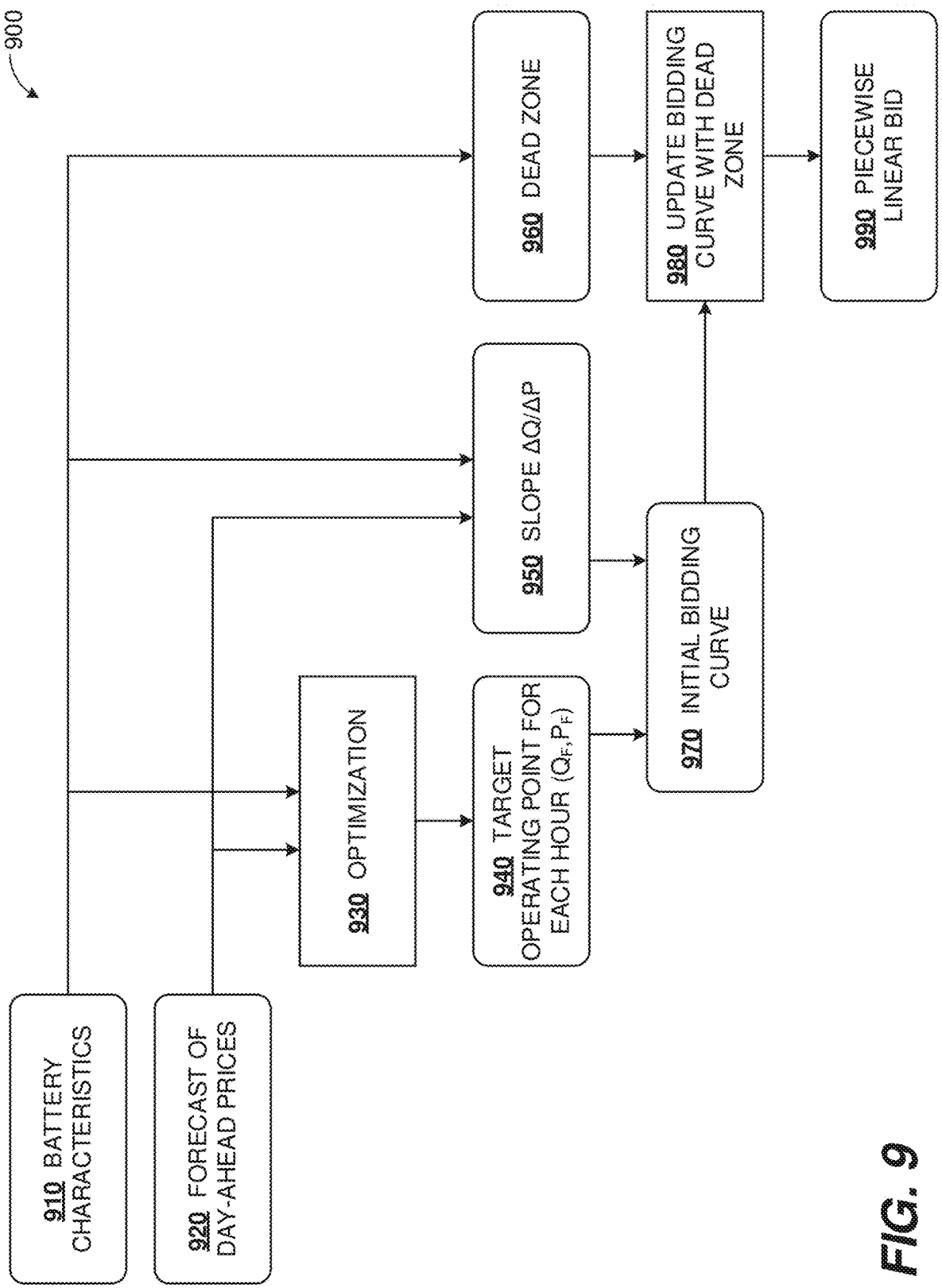
FIG. 9 is a dataflow diagram illustrating some examples of the disclosed technologies.

FIG. 9 is a dataflow diagram 900 illustrating some examples of the disclosed technologies. The dataflow diagram starts with battery characteristics 910 and price forecasts 920 at the top left, and proceeds to a piecewise linear bid 990 at the lower right.

The battery characteristics 910 and price forecasts 920 can be provided as inputs to the optimization block 930, which can determine a target operating point 940 ($Q_F$, $P_F$) for any given time period or all time periods of an upcoming market cycle (e.g. a day ahead). In some examples, the target operating points for multiple time periods can be determined jointly according to a planned temporal evolution of the battery's charge state.

The battery characteristics 910 and price forecasts 920 can also be used to determine a slope 950 ($\Delta Q/\Delta P$). The target point 940 and the slope 950 can be used to create an initial bidding curve 970, which can resemble bids 110 or 410 described herein. Additionally, the battery characteristics 910 can be used to determine dead band 960 in the form of offsets $P_2-P_F$, $P_F-P_1$, with reference to bid 420. The dead band can be used to modify the initial bidding curve 970 at process block 980 to obtain a piecewise linear bidding curve 990, which can resemble bid 420.

XIII. Example Optimization and Slope Calculation

The target point ($Q_F$) determination can be set up as an optimization problem. Table 1 indicates the notation used.

TABLE 1

| Symbol | Description |
| --- | --- |
| T | Length of look-ahead window, e.g. 48 hours. |
| $f_{DA}(t)$ | Predicted energy price, at hour t. |
| $E_{DA}^{out}(t)$ | Bid amount of energy to supply (discharging), at hour t. |
| $E_{DA}^{in}(t)$ | Bid amount of energy to accept (charging), at hour t. |
| $\varphi$ | Constant to model battery degradation, e.g. 0.025 \$/kWh. |
| $E_{stor}^{in}(t)$ | Energy into battery storage, at hour t. |
| $E_{stor}^{out}(t)$ | Energy out of battery storage, at hour t. |
| C(t) | Stored energy in battery, at hour t. |
| $L^{in}$ | Battery charging loss, e.g. 10%. |
| $L^{out}$ | Battery discharging loss, e.g. 10%. |
| RC | Battery maximum rated charging power. |
| RD | Battery maximum rated discharging power. |
| $C^{init}$ | Initial stored energy in battery. |
| $C^{min}$ | Minimum stored energy allowed in battery (State of Charge (SOC) lower limit) |
| $C^{max}$ | Maximum stored energy allowed in battery (State of Charge (SOC) upper limit) |
| $\tau$ | Wrap-up tolerance for SOC at end of time horizon |

An objective function W to be maximized can be written as $$\Psi = \sum_{t=1}^{T} \{F \cdot [E^{out}(t) - E^{in}(t)] - \varphi \cdot [E^{out}(t) + E^{in}(t)]\} \quad (1)$$

subject to the constraints listed in Table 2:

TABLE 2

| Constraint | No. |
| --- | --- |
| $E_{DA}^{in}(t) = E_{stor}^{in}(t) \div \left(1 - \frac{L^{in}}{100}\right)$ | (2-1) |
| $E_{DA}^{out}(t) = E_{stor}^{out}(t) \times \left(1 - \frac{L^{out}}{100}\right)$ | (2-2) |
| $E_{stor}^{in}(t) \leq RC$ | (2-3) |
| $E_{stor}^{out}(t) \leq RD$ | (2-4) |
| $C(1) = C^{init} - E_{stor}^{out}(1) + E_{stor}^{in}(1)$ | (2-5) |
| $C(t) = C(t-1) - E_{stor}^{out}(t) + E_{stor}^{in}(t)$ | (2-6) |
| $C(t) \leq C^{max}$ | (2-7) |
| $C(t) \geq C^{min}$ | (2-8) |
| $C(24) \geq C^{init}\left(1 - \frac{\tau}{100}\right)$ | (2-9) |
| $C(24) \leq C^{init}\left(1 + \frac{\tau}{100}\right)$ | (2-10) |
| $E_{DA}^{in}(t) \geq 0$ | (2-11) |
| $E_{DA}^{out}(t) \geq 0$ | (2-12) |
| $C(t) \geq 0$ | (2-13) |
| $E_{stor}^{in}(t) \geq 0$ | (2-14) |
| $E_{stor}^{out}(t) \geq 0$ | (2-15) |

The optimization can be performed for a number of periods T that differs from the number of periods in the day-ahead cycle. In the illustrated example, T=48 hours and the optimization can be performed over a two-day look-ahead window, while only 24 of the hourly bids, corresponding to the time span of the day-ahead market, are submitted as bids. Time periods can be indexed relative to the current time. For example, if bids corresponding to the following day (midnight to midnight) are to be submitted at 10 am, the bids submitted at 10 am can correspond to time periods t=14:38 The remaining time periods t=39:48 ($2^{nd}$ day) can be recalculated at 10 am the following day, when they can be re-labeled as market periods t=14:24 in a new 48-hour window, together with periods of a $3^{rd}$ day. In other embodiments, and particularly for other markets such as hour-ahead, the look-ahead window (size T) and the number of periods in the market cycle can be equal, e.g. if the bids are submitted at the last moment before the beginning of the day-ahead market period, or the look ahead can be longer. The look ahead window can span at least the day-ahead market period.

The optimization jointly determines an operating plan including $Q_F(t)$ for target energy transfers at each time period, that attempts to maximum profit to the battery, based on the predicted prices and battery characteristics.

To accommodate variations in cleared energy prices, the slope M can be calculated using a formula:

$$\frac{1}{M} = -(1 + SP) \cdot \frac{\max(F) - \min(F)}{RC + RD} \quad (3)$$

where M is the slope $\Delta Q/\Delta P$ of a bid segment, F is the day ahead forecasted price, SP is a coefficient for the battery indicating how sensitive the battery is to price variation, and RC and RD are the maximum charging and discharging power of the battery. The maximum and minimum of the predicted prices can be calculated over the several time periods (e.g. 24 one-hour periods) of the upcoming market cycle (e.g. the day ahead), as each time period will generally have its own predicted price.

In this example, the bids for multiple time periods t=14:38 can have common slope and jointly determined target points ($Q_F(t)$, $P_F(t)$). These bids can be considered jointly determined.

XIV. A Generalized Computing Environment

Figure 10:
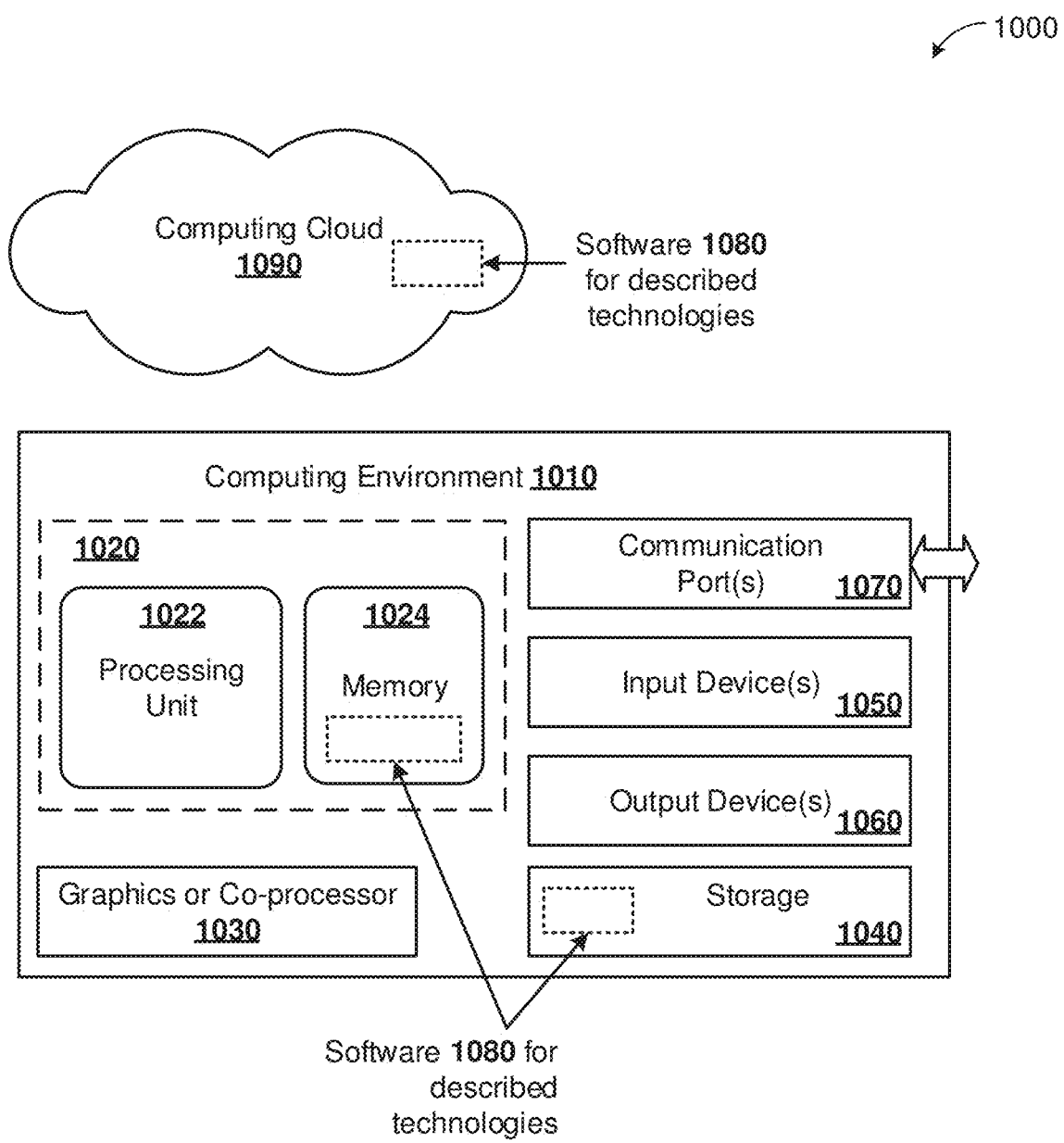
FIG. 10 illustrates a generalized example of a suitable computing environment in which described embodiments, techniques, and technologies can be implemented.

FIG. 10 illustrates a generalized example of a suitable computing system 1000 in which described examples, techniques, and technologies for flexible bidding can be implemented. The computing system 1000 is not intended to suggest any limitation as to scope of use or functionality of the present disclosure, as the innovations can be implemented in diverse general-purpose or special-purpose computing systems. The computing system 1000 can control a disclosed battery, or can implement an agent, a controller, a market coordinator, an aggregator, or other entity described herein; or can acquire, process, output, or store data associated with bidding, the market, batteries, or other equipment or activities described herein.

With reference to FIG. 10, computing environment 1010 includes one or more processing units 1022 and memory 1024. In FIG. 10, this basic configuration 1020 is included within a dashed line. Processing unit 1022 can execute computer-executable instructions, such as for control or data acquisition as described herein. Processing unit 1022 can be a general-purpose central processing unit (CPU), a processor in an application-specific integrated circuit (ASIC), or any other type of processor. In a multi-processing system, multiple processing units execute computer-executable instructions to increase processing power. Computing environment 1010 can also include a graphics processing unit or co-processing unit 1030. Tangible memory 1024 can be volatile memory (e.g., registers, cache, or RAM), non-volatile memory (e.g., ROM, EEPROM, or flash memory), or some combination thereof, accessible by processing units 1022, 1030. The memory 1024 stores software 1080 implementing one or more innovations described herein, in the form of computer-executable instructions suitable for execution by the processing unit(s) 1022, 1030. The memory 1024 can also store control parameters, bid data, market data, or database data. The memory 1024 can also store configuration and operational data.

A computing system 1010 can have additional features, such as one or more of storage 1040, input devices 1050, output devices 1060, or communication ports 1070. An interconnection mechanism (not shown) such as a bus, controller, or network interconnects the components of the computing environment 1010. Typically, operating system software (not shown) provides an operating environment for other software executing in the computing environment 1010, and coordinates activities of the components of the computing environment 1010.

The tangible storage 1040 can be removable or non-removable, and includes magnetic disks, magnetic tapes or cassettes, CD-ROMs, DVDs, or any other medium which can be used to store information in a non-transitory way and which can be accessed within the computing environment 1010. The storage 1040 stores instructions of the software 1080 (including instructions and/or data) implementing one or more innovations described herein. Storage 1040 can also store image data, saturation pixel maps, configuration data, or other databases or data structures described herein.

The input device(s) 1050 can be a mechanical, touch-sensing, or proximity-sensing input device such as a keyboard, mouse, pen, touchscreen, or trackball, a voice input device, a scanning device, or another device that provides input to the computing environment 1010. The output device(s) 1060 can be a display, printer, speaker, optical disk writer, or another device that provides output from the computing environment 1010. Input or output can also be communicated to/from a remote device over a network connection, via communication port(s) 1070.

The communication port(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1000 can also include a computing cloud 1090 in which instructions implementing all or a portion of the disclosed technology are executed. Any combination of memory 1024, storage 1040, and computing cloud 1090 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular data types. The functionality of the program modules can be combined or split between program modules as desired in various embodiments. Computer-executable instructions for program modules can be executed within a local or distributed computing system.

The terms "computing system," "computing environment," and "computing device" are used interchangeably herein. Unless the context clearly indicates otherwise, neither term implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

XV. General Considerations

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the terms "or" or "and/or" mean any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "bid," "clear," "determine," "display," "evaluate," "generate," "optimize," "perform," "produce," "receive," "send," "transmit," and to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as a process executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in B#, C, C++, C#, Fortran, Java, JavaScript, Python, Rust, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented by an integrated circuit (e.g., an application specific integrated circuit ("ASIC") or programmable logic device ("PLD"), such as a field programmable gate array ("FPGA")). The integrated circuit or specialized computing hardware can be embedded in or directly coupled to a battery controller or another computing device.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

What is claimed is:

1. A method comprising:
   at an aggregator:
      receiving a piecewise linear bid on behalf of a battery, for an energy market for a given time period, the piecewise linear bid comprising one or more linear segments and defining a bid quantity for energy transfer as a function of cleared energy price, at least one of the linear segments having a non-zero slope, wherein the bid quantity of the piecewise linear bid spans a range including both charging and discharging of the battery;
      consolidating the received piecewise linear bid with other bids for other batteries into a consolidated bid; and
      forwarding the consolidated bid to a market coordinator to be used in the clearing;
   at the market coordinator:
      clearing the energy market to determine the cleared energy price; and
   at the aggregator:
      receiving a consolidated grant from the market coordinator;
      determining an energy transfer granted to the battery, the determining comprising:
         disaggregating the consolidated grant; and
         evaluating the piecewise linear bid at the cleared energy price; and
      transmitting the granted energy transfer for execution at the battery.

2. The method of claim 1, wherein the clearing is based partly on the received piecewise linear bid.

3. The method of claim 1, wherein the piecewise linear bid extends from a minimum value of the bid quantity to a maximum value of the bid quantity, and comprises a dead band.

4. The method of claim 1, wherein the given time period is one hour in a day ahead period.

5. The method of claim 4, wherein the clearing for the given time period is performed concurrently with clearing at least one other hour of the day ahead period.

6. The method of claim 1, wherein the other bids for the other batteries are also piecewise linear bids for the given time period.

7. The method of claim 6, wherein the clearing is based partly on the piecewise linear bids of the battery and of the other batteries, and is based partly on inputs received from one or more of: an electric utility, a load operator, or the aggregator.

8. A system comprising:
   an aggregator computer configured to:
      receive a piecewise linear bid on behalf of a battery, for an energy market for a given time period, the piecewise linear bid comprising one or more linear segments and defining a bid quantity for energy transfer as a function of cleared energy price, at least one of the linear segments having a non-zero slope, wherein the bid quantity of the piecewise linear bid spans a range including both charging and discharging of the battery;

consolidate the received piecewise linear bid with other bids for other batteries into a consolidated bid; and forward the consolidated bid to a market coordinator to be used in the clearing; and a market coordinator computer configured to:

clear the energy market to determine the cleared energy price;

wherein the aggregator computer is further configured to:

receive a consolidated grant from the market coordinator;

determine an energy transfer granted to the battery, the determining comprising:

disaggregating the consolidated grant; and evaluating the piecewise linear bid at the cleared energy price; and transmit the granted energy transfer for execution at the battery.

9. The system of claim 8, wherein the clearing is based partly on the received piecewise linear bid.

10. The system of claim 8, wherein the piecewise linear bid extends from a minimum value of the bid quantity to a maximum value of the bid quantity, and comprises a dead band.

11. The system of claim 8, wherein the given time period is one hour in a day ahead period.

12. The system of claim 11, wherein the clearing for the given time period is performed concurrently with clearing at least one other hour of the day ahead period.

13. The system of claim 8, wherein the other bids for the other batteries are also piecewise linear bids for the given time period.

14. The system of claim 13, wherein the clearing is based partly on the piecewise linear bids of the battery and of the other batteries, and is based partly on inputs received from one or more of: an electric utility, a load operator, or the aggregator.

15. One or more non-transitory computer-readable media storing executable instructions that cause one or more hardware processors to perform a method of interfacing between a battery and a market coordinator, the executable instructions comprising:

first instructions that, when executed, cause receipt of a piecewise linear bid on behalf of the battery, for an energy market for a given time period, the piecewise linear bid comprising one or more linear segments and defining a bid quantity for energy transfer as a function of cleared energy price, at least one of the linear segments having a non-zero slope, wherein the bid quantity of the piecewise linear bid spans a range including both charging and discharging of the battery;

second instructions that, when executed, cause consolidation of the received piecewise linear bid with other bids for other batteries into a consolidated bid;

third instructions that, when executed, cause the consolidated bid to be forwarded to the market coordinator to be used in the clearing;

fourth instructions that, upon execution subsequent to the market coordinator clearing the energy market and determining the cleared energy price, cause receipt of a consolidated grant from the market coordinator;

fifth instructions that, when executed, cause determination of an energy transfer granted to the battery, the determination comprising:

disaggregation of the consolidated grant; and evaluation of the piecewise linear bid at the cleared energy price; and sixth instructions that, when executed, cause transmission of the granted energy transfer for execution at the battery.

16. The one or more non-transitory computer-readable media of claim 15, wherein the clearing is based partly on the received piecewise linear bid.

17. The one or more non-transitory computer-readable media of claim 15, wherein the piecewise linear bid extends from a minimum value of the bid quantity to a maximum value of the bid quantity, and comprises a dead band.

18. The one or more non-transitory computer-readable media of claim 15, wherein the given time period is one hour in a day ahead period.

19. The one or more non-transitory computer-readable media of claim 18, wherein the clearing for the given time period is performed concurrently with clearing at least one other hour of the day ahead period.

20. The one or more non-transitory computer-readable media of claim 15, wherein the other bids for the other batteries are also piecewise linear bids for the given time period.

21. The one or more non-transitory computer-readable media of claim 20, wherein the clearing is based partly on the piecewise linear bids of the battery and of the other batteries, and is based partly on inputs received from one or more of: an electric utility, a load operator, or the aggregator.

* * * * *